United States Patent
Lin et al.

(10) Patent No.: US 11,451,816 B2
(45) Date of Patent: Sep. 20, 2022

(54) STORAGE OF MOTION VECTORS FOR AFFINE PREDICTION

(71) Applicant: MediaTek Inc., Hsinchu (TW)

(72) Inventors: Zhi-Yi Lin, Hsinchu (TW); Tzu-Der Chuang, Hsinchu (TW); Ching-Yeh Chen, Hsinchu (TW); Man-Shu Chiang, Hsinchu (TW); Chih-Wei Hsu, Hsinchu (TW)

(73) Assignee: MediaTek Inc.

( * ) Notice: Subject to any disclaimer, the term of this patent is extended or adjusted under 35 U.S.C. 154(b) by 4 days.

(21) Appl. No.: 16/392,040

(22) Filed: Apr. 23, 2019

(65) Prior Publication Data

US 2019/0327482 A1    Oct. 24, 2019

Related U.S. Application Data

(60) Provisional application No. 62/742,283, filed on Oct. 6, 2018, provisional application No. 62/723,535, filed
(Continued)

(51) Int. Cl.
 *H04N 19/513* (2014.01)
 *H04N 19/176* (2014.01)

(52) U.S. Cl.
 CPC ......... *H04N 19/513* (2014.11); *H04N 19/176* (2014.11)

(58) Field of Classification Search
 CPC ........................... H04N 19/513; H04N 19/176
(Continued)

(56) References Cited

U.S. PATENT DOCUMENTS

| 2005/0053300 A1* | 3/2005 | Mukerjee | ............ | H04N 19/523 |
| | | | | 382/239 |
| 2015/0365680 A1* | 12/2015 | Chuang | ................ | H04N 19/159 |
| | | | | 375/240.02 |

(Continued)

FOREIGN PATENT DOCUMENTS

TW       201742465 A    12/2017

OTHER PUBLICATIONS

China National Intellectual Property Administration, International Search Report and Written Opinion for International Patent Application No. PCT/CN2019/084122, dated Jul. 4, 2019.
(Continued)

*Primary Examiner* — Matthew K Kwan
(74) *Attorney, Agent, or Firm* — Han IP PLLC; Andy M. Han

(57) ABSTRACT

A video coder implementing affine prediction is provided. The video coder receives input data associated with a current block to be coded. The video coder derives a control point motion vector (CPMV) of the current block according to an affine model. The video coder derives a set of motion compensation motion vectors (MCMVs) for a set of sub-blocks of the current block based on the derived CPMV of the current block according to the affine model. The video coder performs motion compensation for the current block based on the set of MCMVs. The CPMV of the current block is derived based on a CPMV of a first reference block that is a neighboring block located in a same region of the current block or an MCMV of a second reference block that is not a neighboring block located in the same region of the current block.

10 Claims, 12 Drawing Sheets

Related U.S. Application Data on Aug. 28, 2018, provisional application No. 62/764,748, filed on Aug. 15, 2018, provisional application No. 62/717,162, filed on Aug. 10, 2018, provisional application No. 62/687,291, filed on Jun. 20, 2018, provisional application No. 62/661,665, filed on Apr. 24, 2018.

(58) Field of Classification Search
USPC .................................................. 375/240.16
See application file for complete search history.

(56) References Cited

U.S. PATENT DOCUMENTS

| | | | |
|---|---|---|---|
| 2017/0332095 A1* | 11/2017 | Zou | H04N 19/124 |
| 2018/0098062 A1 | 4/2018 | Li et al. | |
| 2018/0098063 A1 | 4/2018 | Chen et al. | |
| 2018/0192069 A1* | 7/2018 | Chen | H04N 19/51 |
| 2019/0116376 A1* | 4/2019 | Chen | H04N 19/513 |
| 2019/0174136 A1* | 6/2019 | Jun | H04N 19/593 |

OTHER PUBLICATIONS

Feng Zou et al., Improved affine motion prediction, Joint Video Exploration Team (JVET) of ITU-T SG 16 WP 3 and ISO/IEC JTC 1/SC 29/WG 11, 3rd Meeting, Geneva, Switzerland, May 26-Jun. 1, 2016, JVET-C0062_v2, Jun. 1, 2016.

* cited by examiner

STORAGE OF MOTION VECTORS FOR AFFINE PREDICTION

CROSS REFERENCE TO RELATED PATENT APPLICATION(S)

The present disclosure is part of a non-provisional application that claims the priority benefit of U.S. Provisional Patent Application Nos. 62/661,665, 62/687,291, 62/717,162, 62/764,748, 62/723,535, and 62/742,283, filed on 24 Apr. 2018, 20 Jun. 2018, 10 Aug. 2018, 15 Aug. 2018, 28 Aug. 2018, and 6 Oct. 2018, respectively. Contents of above-listed applications are herein incorporated by reference.

TECHNICAL FIELD

The present disclosure relates generally to video processing. In particular, the present disclosure relates to usage, storage, retrieval, and derivation of motion vectors associated with control points for affine prediction.

BACKGROUND

Unless otherwise indicated herein, approaches described in this section are not prior art to the claims listed below and are not admitted as prior art by inclusion in this section.

High-Efficiency Video Coding (HEVC) is a new international video coding standard developed by the Joint Collaborative Team on Video Coding (JCT-VC). HEVC is based on the hybrid block-based motion-compensated Discrete Cosine Transform (DCT) coding architecture. The basic unit for compression, termed coding unit (CU), is a 2N×2N square block, and each CU can be recursively split into four smaller CUs until the predefined minimum size is reached. Each CU contains one or multiple prediction units (PUs). For each PU, either Intra Prediction or Inter Prediction can be used. While temporal reconstructed reference frames are used for predictions in Inter Prediction modes, spatial reconstructed pixels within the same frame are used for Intra Prediction modes. After prediction, the predicted residues for one CU are divided into transform units (TUs) and coded using transform and quantization. Like many other precedent standards, HEVC adopts Discrete Cosine Transform type II (DCT-II) as its core transform because it has a strong "energy compaction" property.

To achieve the best coding efficiency of hybrid coding architecture in HEVC, for inter prediction modes, there are three different modes, including Skip, Merge and Inter Advanced Motion Vector Prediction (AMVP) modes.

When a PU is coded in Inter AMVP mode, motion-compensated prediction is performed with transmitted motion vector differences (MVDs) that can be used together with Motion Vector Predictors (MVPs) for deriving motion vectors (MVs). To decide MVP in Inter AMVP mode, the advanced motion vector prediction (AMVP) scheme is used to select a motion vector predictor among an AMVP candidate set, which includes two spatial MVPs and one temporal MVP. So, in AMVP mode, MVP index for MVP and the corresponding MVDs are required to be encoded and transmitted. In addition, the inter prediction direction to specify the prediction directions among bi-prediction, and uni-prediction which are list 0 (L0) and list 1 (L1), accompanied with the reference frame index for each list should also be encoded and transmitted.

When a PU is coded in either Skip or Merge mode, no motion information is transmitted except the Merge index of the selected candidate. That is because the Skip and Merge modes utilize motion inference methods (MV=MVP+MVD where MVD is zero) to obtain the motion information from spatially neighboring blocks (spatial candidates) or a temporal block (temporal candidate) located in a co-located picture where the co-located picture is the first reference picture in list 0 or list 1, which is signaled in the slice header. In the case of a Skip PU, the residual signal is also omitted.

HEVC uses only translation motion model for motion compensation prediction. There are many other types of motions in the real world, such as zoom-in and zoom-out, rotation, perspective motions, and other irregular motions. Some of these other types of motions can be represented by affine transformation or affine motion, which preserves points, straight lines and planes. An affine transformation does not necessarily preserve angles between lines or distances between points, but it does preserve ratios of distances between points lying on a straight line.

SUMMARY

The following summary is illustrative only and is not intended to be limiting in any way. That is, the following summary is provided to introduce concepts, highlights, benefits and advantages of the novel and non-obvious techniques described herein. Select and not all implementations are further described below in the detailed description. Thus, the following summary is not intended to identify essential features of the claimed subject matter, nor is it intended for use in determining the scope of the claimed subject matter.

Some embodiments of the disclosure provide a video coder that implements affine prediction by separately storing control point motion vectors (CPMV) and motion compensation motion vectors (MCMV). The video coder receives input data associated with a current block to be coded. The video coder derives a control point motion vector (CPMV) of the current block for a control point according to an affine model. The video coder derives a set of motion compensation motion vectors (MCMVs) for a set of sub-blocks of the current block based on the derived CPMV of the current block according to the affine model. The video coder performs motion compensation for the current block based on the derived set of MCMVs. The video coder stores the derived CPMV of the current block in a first storage and the derived MCMVs for the set of sub-blocks in a second, different storage. The CPMV stored in the first storage is used to derive affine candidates, and the set of MCMVs stored in the second storage are used to derive non-affine candidate. In an example, the video coder retrieves MCMVs of the current block from the second storage and uses the retrieved MCMVs to filter boundaries between sub-blocks of the current block. In another example, the video coder retrieves MCMVs of the current block or a neighboring block of the current block from the second storage, and uses the retrieved MCMVs to perform a deblocking process on the current block or the neighboring block.

The video coder derives the CPMV of the current block by identifying a reference block of the current block, retrieving a CPMV of the reference block from the first storage when the reference block and the current block are located in a same region. Alternatively, the video coder retrieves an MCMV of the reference block from the second storage when the reference block and the current block are not located in the same region. When the reference block and the current block are not located in the same region, the video coder may retrieve a MCMV of a sub-block of the reference block from the second storage.

The second storage may be a buffer that stores motion information associated blocks immediately above a row of coding tree units (CTUs) that includes the current block but does not store motion information associated with blocks that are not immediately above the row of CTUs. The second storage may also be a buffer that stores motion information associated blocks immediately above the current block or immediately left of the current block. The second storage may also be a buffer whose motion information are updated by the motion information of the last row in each CTU.

The CPMV of the current block may be derived from a MCMV of a corner sub-block of the second reference block. The MCMV of a corner sub-block is positioned near a center of the corner sub-block. In some embodiments, the CPMV of the current block may be derived from one or mode coded CPMVs, or one or more coded MCMVs.

In some embodiments, the video coder derives a control point motion vector (CPMV) of the current block that is associated with a position at a bottom-right corner of the current block. The video coder derives a set of MCMVs for a set of sub-blocks of the current block based on the derived CPMV according to an affine model. The video coder performs motion compensation for the current block based on the set of MCMVs. In some embodiments, the CPMV is a first CPMV, the video coder also derives a second CPMV that is associated with a bottom-left corner of the current block. The first and second CPMVs are stored in a first storage. The first and third CPMVs are stored in a first storage. In some embodiments, the first, second, and third CPMVs are stored in a first storage.

BRIEF DESCRIPTION OF THE DRAWINGS

The accompanying drawings are included to provide a further understanding of the present disclosure, and are incorporated in and constitute a part of the present disclosure. The drawings illustrate implementations of the present disclosure and, together with the description, serve to explain the principles of the present disclosure. It is appreciable that the drawings are not necessarily in scale as some components may be shown to be out of proportion than the size in actual implementation in order to clearly illustrate the concept of the present disclosure.

DETAILED DESCRIPTION

Figure 1:
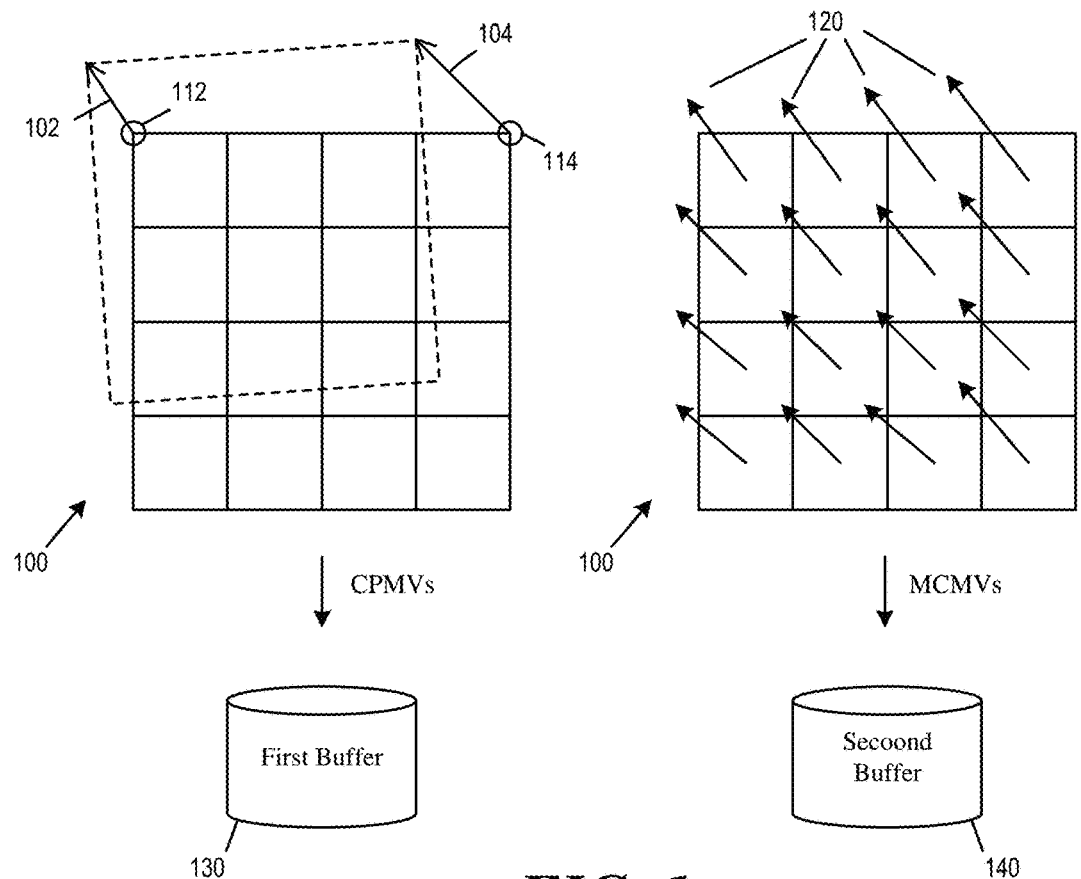
FIG. 1 conceptually illustrates storing CPMVs and MCMVs of the current block in separate storages for subsequent video processing operations.

In the following detailed description, numerous specific details are set forth by way of examples in order to provide a thorough understanding of the relevant teachings. Any variations, derivatives and/or extensions based on teachings described herein are within the protective scope of the present disclosure. In some instances, well-known methods, procedures, components, and/or circuitry pertaining to one or more example implementations disclosed herein may be described at a relatively high level without detail, in order to avoid unnecessarily obscuring aspects of teachings of the present disclosure.

A video coder may implement motion prediction based on affine transformation or affine motion. This type of motion prediction, also referred to as affine prediction, includes affine AMVP and affine merge mode (merge mode having one or more merge candidates for affine prediction). When coding a block of pixels by affine prediction, affine motion vectors are used to characterize the motion of the content of the block. Each affine motion vector represents the affine motion at a specific position of the block (e.g., a corner of the block), which is referred to as a control point of the block. An affine motion vector is therefore also referred as control point motion vector (CPMV). The video coder also uses motion vectors at other positions of the block (e.g., the center of the block or the center positions of sub-blocks of the block) to reference pixels outside of the block for motion compensation. These motion vectors are referred to as motion compensation motion vectors (MCMVs). For a block that is coded by affine prediction, the block's MCMVs may be derived from the block's CPMVs based on the affine motion of the block.

The CPMVs and MCMVs of a currently coded block of pixels (current block) may be used by subsequent video processing operations of the block and other blocks. For example, the MCMVs of the current block may be used for deblocking, overlapped block motion compensation (OBMC), motion compensation prediction using only translation motion model (e.g., regular merge mode, and regular AMVP mode), while the CPMVs of the current block may be used for motion compensation prediction using affine motion model. In some embodiments, the CPMVs of the current block are stored in a first storage, while the MCMVs of the current block are stored in a second, different storage. This allows both CPMVs and MCMVs to be available for the subsequent video processing operations.

In some embodiments, in order to reduce the storage usage for supporting affine prediction, the first storage is a temporary storage that stores the CPMVs of the current block for only a limited duration, e.g., to make the CPMVs of the current block be available for neighboring blocks to reference for affine prediction (e.g., as a candidate in merge mode) but not for non-neighboring blocks. Conversely, to identify the CPMVs of the current block by referencing a CPMV of a reference block, the video coder may retrieve a CPMV from the first storage if the reference block is a neighboring block located in a same region of the current block. However, if the reference block is not a neighboring block located in the same region of the current block, the video coder may retrieve a MCMV of the reference block from the second storage and derives the CPMV of the current block from the retrieved MCMV based on their relative positions.

FIG. 1 conceptually illustrates a video coder storing CPMVs and MCMVs of the current block in separate storages for subsequent video processing operations. Specifically, the figure illustrates a block of pixels (current block 100) that is currently being coded by a video coder by using affine prediction. The current block 100 is part of a video picture in a video sequence. The block of pixels may be a CU, TU, or CTU.

The affine prediction is based on affine motion of the content of the current block, which moves to the left, rotates, and zooms out. The affine motion is described by CPMVs 102 and 104, which describes the motion at two control points 112 and 114 that are located at top left corner and top right corner of the current block 100.

To code the current block 100 by affine prediction, the video coder uses the CPMVs 102 and 104 to locate and identify prediction pixels elsewhere in the video sequence. Specifically, the video coder uses the CPMVs 102 and 104 to compute a MV field for the current block. For a block of pixels that is divided into sub-blocks such as the current block 100, the MV field includes MCMVs 120 that the video coder computes for the sub-blocks based on the CPMVs 102 and 104. (Each sub-block may be a 4×4 block, or a block that has the smallest block size for a motion vector). Unlike a CPMV which is located at a corner of the block being affine predicted, a MCMV is located at the center of the block or sub-block for which the MCMV is used to perform motion compensation.

The CPMVs 102 and 104 are stored in a first buffer 130 and the MCMVs 120 are stored in a second buffer 140. Merge mode prediction of subsequent pixel blocks may reference the CPMVs stored in the first buffer 130 for deriving affine merge candidates and the MCMVs stored in the second buffer 140 for deriving non-affine merge candidates. The video coder may also perform boundary filtering such as deblocking or OBMC for the current block by retrieving the MCMVs of the different sub-blocks stored in the second buffer 140.

To derive the CPMVs 102 and 104, the video coder may access either CPMV or MCMV of a reference block of the current block 100. When the reference block is located in the same region of the current block 100, the video coder may retrieve CPMV of the reference block from the first buffer 130, so as to derive the CPMV of the current block 100. When the reference block is not located in the same region of the current block 100, the video coder may retrieve a MCMV of the reference block from the second storage and derive a CPMV from the retrieved MCMV. A reference block may be a CU, PU, TU, or a sub-block that is adjacent to the current block. Besides the CPMVs 102 and 104 of the current block 100, the first buffer 130 is limited to storing only CPMVs of reference blocks that are neighboring blocks located in the same region and not of reference blocks that are not neighboring blocks located in the same region of the current block. In other words, CPMVs are stored in the first buffer 130 for limited duration in order to reduce storage usage.

Figure 2:
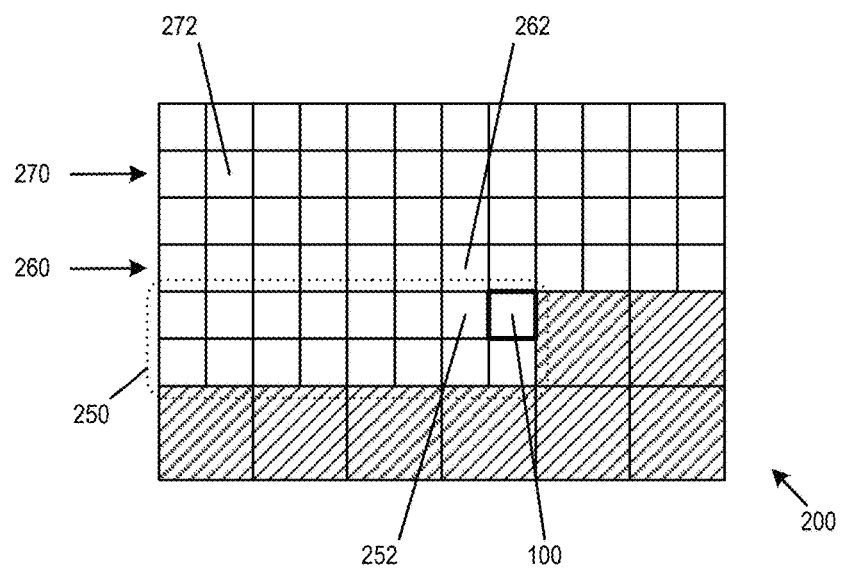
FIG. 2 illustrates neighboring blocks from which the video coder may retrieve a CPMV.

FIG. 2 illustrates neighboring blocks located in the same region of the current block from which the video coder may retrieve a CPMV from the first buffer. The figure illustrates a video picture 200 that includes the current block 100. The current block 100 is in a CTU row 250. A reference block 252 is in the CTU row 250. A reference block 262 is in a row of blocks 260 that is adjacent to the top of the CTU row 250. A reference block 272 is in a row of blocks 270 that is located above the CTU row 250 and the row of blocks 260. The shaded area of the video picture 200 are pixel blocks or CTUs that are not yet coded (to be coded after the current block) and therefore not used as reference for prediction.

In some embodiments, the neighboring block 252 and the neighboring block 262 are considered neighboring block located in the same region of the current block, and therefore the video coder may retrieve CPMVs of the reference blocks 252 and 262 from the first buffer 130. The reference block 272 is not considered a neighboring block located in the same region of the current block because it is too far away from the current block 100 and coded too far back in time. The CPMVs of the reference block 272 once stored in the first buffer 130 may have already been overwritten by subsequent data. The video coder may therefore derive the CPMV of the current block 100 from a MCMV of the reference block 272 stored in the second buffer 140. The MV buffer is described by reference to FIG. 5 and FIG. 7 below.

The affine motion that is used for prediction of the current block 100 may be based on a 4-parameter affine model. When an affine motion block is moving according to a 4-parameter model, the MV field of the block may be described by four parameters a, b, e, f according to the following:

$$\begin{cases} x' = ax + by + e \\ y' = -bx + ay + f \end{cases} \quad \text{Eq. 1}$$

The MV field of the block may also be described by two control point motion vectors $v_0$ and $v_1$ according to the following:

$$\begin{cases} v_x = \frac{(v_{1x} - v_{0x})}{w}x - \frac{(v_{1y} - v_{0y})}{w}y + v_{0x} \\ v_y = \frac{(v_{1y} - v_{0y})}{w}x + \frac{(v_{1x} - v_{0x})}{w}y + v_{0y} \end{cases} \quad \text{Eq. 2}$$

Where $(v_x, v_y)$ is the MCMV at position $(x, y)$, $(v_{0x}, v_{0y})$ is a first CPMV at the top-left corner of the block, and $(v_{1x}, v_{1y})$ is a second CPMV at the top-right corner of the block.

The affine motion that is used for prediction of the current block 100 may also be based on a 6-parameter affine model. When an affine motion block is moving according to a 6-parameter model, the MV field of the block may be described by six parameters a, b, c, d, e, f according to the following:

$$\begin{cases} x' = ax + by + e \\ y' = cx + dy + f \end{cases} \quad \text{Eq. 3}$$

The MV field of the block may also be described by three control point motion vectors $v_0$, $v_1$, and $v_2$ according to the following:

$$\begin{cases} v_x = \frac{(v_{1x} - v_{0x})}{w}x + \frac{(v_{2x} - v_{0x})}{h}y + v_{0x} \\ v_y = \frac{(v_{1y} - v_{0y})}{w}x + \frac{(v_{2y} - v_{0y})}{h}y + v_{0y} \end{cases} \quad \text{Eq. 4}$$

Where $(v_x, v_y)$ is the MCMV at position (x, y), $(v_{0x}, v_{0y})$ is a first CPMV at the top-left corner of the block, $(v_{1x}, v_{1y})$ is a second CPMV at the top-right corner of the block, and $(v_{2x}, v_{2y})$ is a third CPMV at the bottom-left corner of the block, In some embodiments, a block of pixels may be coded by affine merge mode. If the current block is coded by affine merge mode, the neighboring blocks of the current block are examined to determine whether any one of them is affine coded block (coded by e.g., affine inter mode or affine merge mode). If so, the MV of the top-left sub-block of the affine coded neighboring block and the MV of the top-right sub-block of the affine coded neighboring block are used to derive the affine parameters (or the MVs of the control points) of the affine merge candidate for the current block. When a third control point is used, the MV of the bottom-left sub-block of the affine coded neighboring block is also used.

Figure 3:
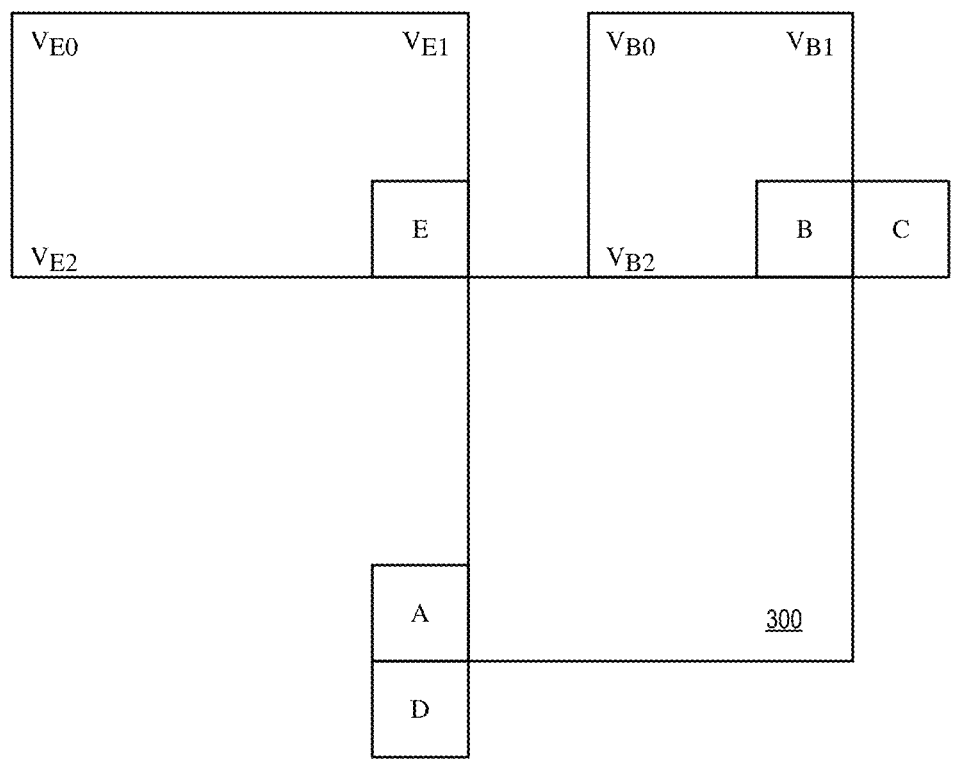
FIG. 3 illustrates a current block using the CPMVs of neighboring blocks to derive affine parameters.

FIG. 3 illustrates a current block using the CPMVs of affine coded neighboring blocks to derive affine parameters of merge candidates. In the figure, block B and block E are affined coded neighboring blocks of the current block 300. To derive the affine parameters of block B, the MVs $V_{B0}$ and $V_{B1}$ are used. To derive the affine parameters of block E, the MVs $V_{E0}$ and $V_{E1}$ are used. The MVs $V_{B2}$ and $V_{E2}$ are also used if the affine motion is based on a six parameter/three control point model. The derived affine parameters of block B and block E are used as merge candidates for the current block 300.

I. MV Buffer Reduction for Affine Prediction

Figure 11A:
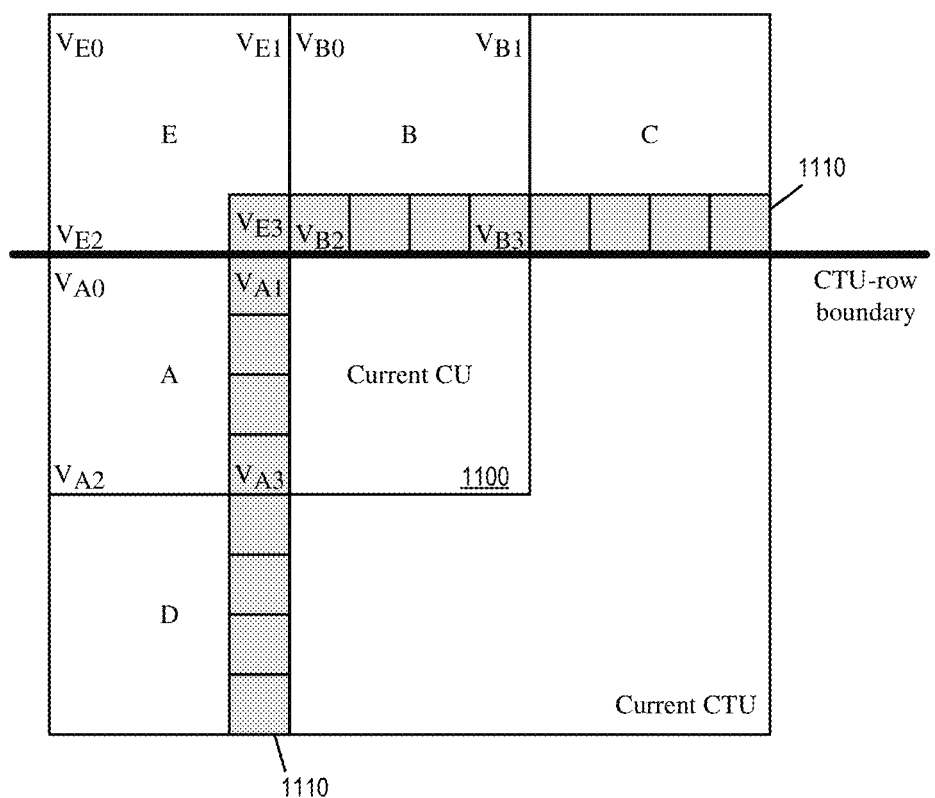
FIGS. 11a-11b each conceptually illustrates a line buffer that stores CPMVs of neighboring blocks or sub-blocks.
Figure 11B:
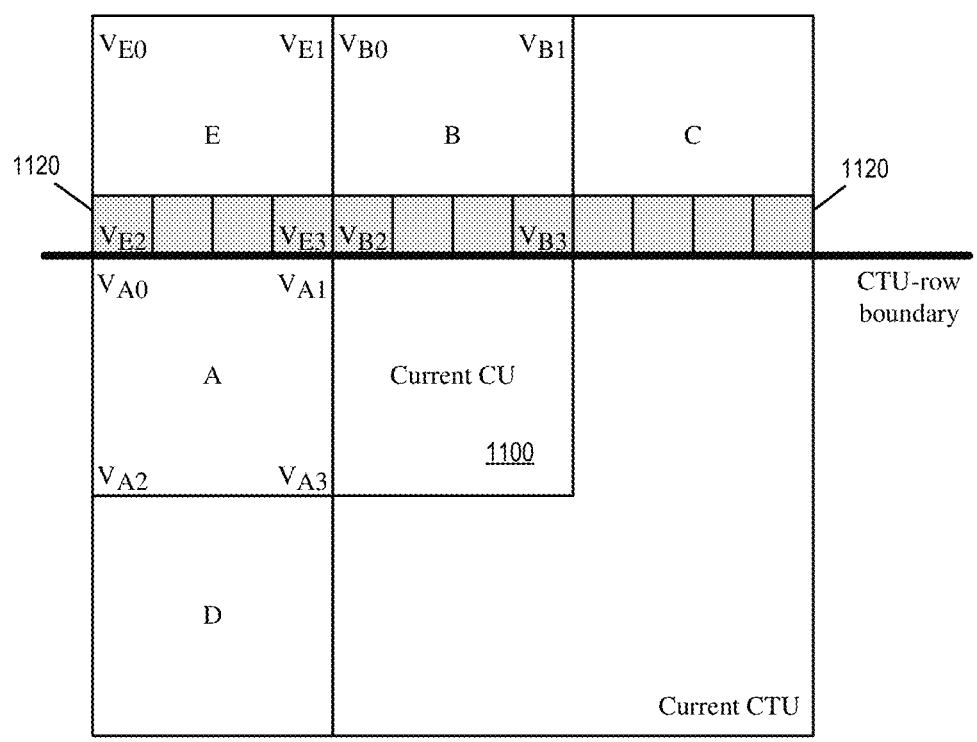

As mentioned, in order to reduce storage usage for supporting affine prediction, CPMVs and MCMVs are stored in the buffer for only a limited duration. In general hardware implementation, additional buffers, called line buffers, are used to store information outside the current CTU. For information inside the current CTU, the buffers called local buffers are used. The line buffer stores MVs for one row and/or one column of neighboring blocks or sub-blocks for the current block to reference. In some embodiments, the line buffer stores the MVs of the bottom-most row of blocks or sub-blocks of a CTU row. The MVs stored in the line buffer includes CPMVs used for affine prediction of neighboring blocks and the MCMV of the sub-blocks. FIG. 11a-b conceptually illustrates a line buffer that stores CPMVs or MCMVs of neighboring blocks or sub-blocks. The figure illustrates a current block 1100 (current CU) and its neighboring blocks A, B, C, D, and E. FIG. 11a illustrates a line buffer 1110 that stores the MVs of the bottom-most row of the above CTU row and the MVs of the right-most column of a CTU at the left of the current block 1100. In this example, when the current block 1100 is being coded, MVs $V_{A1}$, $V_{A3}$, $V_{B2}$, $V_{B3}$, and $V_{E3}$ are stored in the line buffer 1110 (shaded) for the video coder to access. FIG. 11b illustrates a line buffer 1120 that stores the MVs of the bottom-most row of blocks or sub-blocks of a CTU row that is immediately above the current CTU row. In this example, when the current block 1100 is being coded, MVs $V_{B2}$, $V_{B3}$, $V_{E2}$ and $V_{E3}$ are stored in the line buffer 1120 (shaded) for the video coder to access.

When deriving a 4-parameter/6-parameter affine candidates from the neighboring block, two/three control point MVs or two/three sub-block MVs of the neighboring blocks are used. For example, in FIG. 11a, if the MV of the block A is the selected candidate, the MVs $V_{A1}$ and $V_{A3}$ are used to derive a 4-parameter affine merge/AMVP candidate for the current block. In FIG. 11b, if the MV of block B is the selected candidate. Since block B is above the current CTU/CTU-row, only the MVs in the bottom row of that CTU are stored. In one embodiment, the bottom-left MV and the bottom-right MV of block B are used. The MVs $V_{B2}$ and $V_{B3}$ are used to derive a 4-parameter affine merge candidate for the current block. In some embodiments, the block E is not used to derive an affine candidate. For example, when the line buffer 1110 stores the neighboring MV row and MV column of the current CTU, the CPMVs $V_{E1}$, $V_{E2}$, $V_{E3}$ are not stored in the line buffer 1110, the block E is not used to derive the affine candidate for the current block 1100.

The line buffer is limited to storing only MVs immediately neighboring the current block or immediately above the current CTU row. However, some corner CPMVs do not immediately neighbor the current block or the current CTU row and therefore are not stored in the line buffer. In some embodiments, when deriving affine parameters or affine candidates, if the reference MVs are not all stored in the buffer, the video coder may use one or more MVs that are not corner CPMVs.

Figure 12:
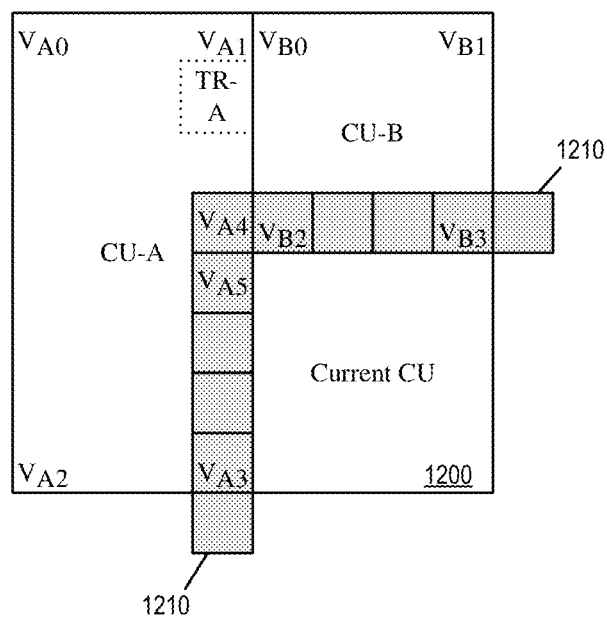
FIG. 12 illustrates the derivation of affine parameters using non-corner MVs.

FIG. 12 illustrates the derivation of affine parameters, including using non-corner MVs to derive affine parameters. The current block 1200 has a left neighbor block A (CU-A) and an above neighbor block B (CU-B). Block A is larger than the current block 1200 and block B. A line buffer 1210 stores one row of MVs immediately above the current block 1200 and one column of MVs immediately to the left of the current block. The CPMV $V_{A1}$ is not stored in the line buffer 1210, even though it is a corner CPMV of block CU-A. Instead, the video coder may use other MVs in the line buffer 1210 to derive affine parameters for block A candidate. For example, the video coder may retrieve $V_{A3}$, $V_{A4}$, $V_{A5}$ from the line buffer to derive the affine parameters of block A, even though $V_{A4}$, $V_{A5}$ are not corner CPMVs.

In some embodiments, $V_{A3}$ (the bottom-right corner MV of CU-A) and a MV of a top-right sub-block of CU-A (TR-A sub-block) are used to derive the affine parameters of the block A. The distance between the $V_{A3}$ sub-block and TR-A sub-block is a power of 2 value. The position of TR-A is derived from the position of CU-A, the height of CU-A, the position of current CU, the height of current CU, or a combination of above information.

In some embodiments, the two control points (4-parameter) affine candidate is derived from block B (CU-B) according to the following:

$$V_{0\_x} = V_{B2\_x} - (V_{B3\_y} - V_{B2\_y}) * (\text{posCurPU}\_Y - \text{posB2}\_Y) / \text{RefPU}_B\_\text{width} + (V_{B3\_x} - V_{B2\_x}) * (\text{posCurPU}\_X - \text{posB2}\_X) / \text{RefPU}_B\_\text{width}$$

$$V_{0\_y} = V_{B2\_y} + (V_{B3\_x} - V_{B2\_x}) * (\text{posCurPU}\_Y - \text{posB2}\_Y) / \text{RefPU}_B\_\text{width} + (V_{B3\_y} - V_{B2\_y}) * (\text{posCurPU}\_X - \text{posB2}\_X) / \text{RefPU}_B\_\text{width}$$

$$V_{1\_x} = V_{0\_x} + (V_{B3\_x} - V_{B2\_x}) * (\text{PU\_width} / \text{RefPU}_B\_\text{width})$$
or $$V_{1\_x} = V_{B2\_x} - (V_{B3\_y} - V_{B2\_y}) * (\text{posCurPU}\_Y - \text{posB2}\_Y) / \text{RefPU}_B\_\text{width} + (V_{B3\_x} - V_{B2\_x}) * (\text{posCurPU\_TR}\_X - \text{posB2}\_X) / \text{RefPU}_B\_\text{width or}$$

$$V_{1\_x} = V_{B2\_x} - (V_{B3\_y} - V_{B2\_y}) * (\text{posCurPU\_TR}\_Y - \text{posB2}\_Y) / \text{RefPU}_B\_\text{width} + (V_{B3\_x} - V_{B2\_x}) * (\text{posCurPU\_TR}\_X - \text{posB2}\_X) / \text{RefPU}_B\_\text{width}$$

$$V_{1\_y} = V_{0\_y} + (V_{B3\_y} - V_{B2\_y}) * \text{PU\_width} / \text{RefPU}_B\_\text{width}$$
or $$V_{1\_y} = V_{B2\_y} + (V_{B3\_x} - V_{B2\_x}) * (\text{posCurPU}\_Y - \text{posB2}\_Y) / \text{RefPU}_B\_\text{width} + (V_{B3\_y} - V_{B2\_y}) * (\text{posCurPU\_TR}\_X - \text{posB2}\_X) / \text{RefPU}_B\_\text{width or}$$

$V_{1\_y}=V_{B2\_y}+(V_{B3\_x}-V_{B2\_y})*(posCurPU\_TR\_Y-posB2\_Y)/RefPU_B\_width+(V_{B3\_y}-V_{B2\_y})*(posCurPU\_TR\_X-posB2\_X)/RefPU_B\_width$ Or according to the following equations:

$V_{0\_x}=V_{B2\_x}-(V_{B3\_y}-V_{B2\_y})*(posCurPU\_Y-posB2\_Y)/(posB3\_X-posB2\_X)+(V_{B3\_x}-V_{B2\_x})*(posCurPU\_X-posB2\_X)/(posB3\_X-posB2\_X)$ $V_{0\_y}=V_{B2\_y}+(V_{B3\_x}-V_{B2\_x})*(posCurPU\_Y-posB2\_Y)/(posB3\_X-posB2\_X)+(V_{B3\_y}-V_{B2\_y})*(posCurPU\_X-posB2\_X)/(posB3\_X-posB2\_X)$ $V_{1\_x}=V_{0\_x}+(V_{B3\_x}-V_{B2\_x})*PU\_width/(posB3\_X-posB2\_X)$ $V_{1\_x}=V_{B2\_x}-(V_{B3\_y}-V_{B2\_y})*(posCurPU\_Y-posB2\_Y)/(posB3\_X-posB2\_X)+(V_{B3\_x}-V_{B2\_x})*(posCurPU\_TR\_X-posB2\_X)/(posB3\_X-posB2\_X)$ or $V_{1\_x}=V_{B2\_x}-(V_{B3\_y}-V_{B2\_y})*(posCurPU\_TR\_Y-posB2\_Y)/(posB3\_X-posB2\_X)+(V_{B3\_x}-V_{B2\_x})*(posCurPU\_TR\_X-posB2\_X)/(posB3\_X-posB2\_X)$ $V_{1\_y}=V_{0\_y}+(V_{B3\_y}-V_{B2\_y})*PU\_width/(posB3\_X-posB2\_X)$ or $V_{1\_y}=V_{B2\_y}+(V_{B3\_x}-V_{B2\_x})*(posCurPU\_Y-posB2\_Y)/(posB3\_X-posB2\_X)+(V_{B3\_y}-V_{B2\_y})*(posCurPU\_TR\_X-posB2\_X)/(posB3\_X-posB2\_X)$ or $V_{1\_y}=V_{B2\_y}+(V_{B3\_x}-V_{B2\_x})*(posCurPU\_TR\_Y-posB2\_Y)/(posB3\_X-posB2\_X)+(V_{B3\_y}-V_{B2\_y})*(posCurPU\_TR\_X-posB2\_X)/(posB3\_X-posB2\_X)$ where $V_{B0}$, $V_{B1}$, and $V_{B2}$ can be replaced by the corresponding MVs of any other selected reference/neighboring PU, (posCurPU_X, posCurPU_Y) are the position of the top-left corner sample or the position of the top-left corner sub-block of the current block, (posCurPU_TR_X, posCurPU_TR_Y) are the position of the top-right corner sample or the position of the top-right corner sub-block of the current block, (posRefPU_X, posRefPU_Y) are the pixel position of the reference corner sample or the position of the reference corner sub-block of the reference/neighboring PU. For example, (posB2_X, posB2_Y) are the position of the bottom-left or center sample of the B2 block or the position of the B0 block, (posB3_X, posB3_Y) are the position of the bottom-right or center sample of the B2 block or the position of the B0 block. The reference sample position of the referenced corner sub-block (e.g. posB2, posB3) may be different positions in different sub-block.

In some embodiments, CPMVs or MCMVs of a particular region are all stored in the line buffer. Within the particular region, all MVs are stored and may be used for deriving the affine parameters. If the affine prediction of the current block references a MV that falls outside of the region, the MVs stored in the line buffer (e.g. CTU row line buffer, CU row line buffer, CTU column line buffer, and/or CU column line buffer) are used. In some embodiments, the 6-parameter affine model may be reduced to 4-parameter affine model when not all control points MVs are available. When the referenced MVs are inside the region, the 6-parameter affine model or 4-parameter affine or another affine model may be used. In some embodiments, inside the region, all MVs are stored and can be used for deriving affine parameters. If a referenced MV is outside of the region, the referenced MV may not be used to derive an inherited affine candidate, but may be used to derive a corner derived affine candidate (an affine candidate that is constructed from the CPMVs of different neighboring block/sub-block).

The particular region of the line buffer can be a CTU, a CTU-row, a tile boundary, an M×N block, or a slice. The M×N block can be 64×64 block, or a block that size is the same as the maximum TU size. For example, for the MVs above the current CTU-row, the MVs stored in the one row line buffer (e.g. storing the MVs of the row above the current CTU row) can be used (e.g. when $V_{B0}$ and $V_{B1}$ are not available). The MVs within the current CTU row (e.g. the $V_{A0}$, $V_{A1}$, $V_{A2}$, and $V_{A3}$) can be used to derive the 4-parameter affine candidate or the 6-parameter affine candidate. In some embodiments, if the reference block is in the above CTU row, the 4-parameter affine model is used. Otherwise, the 6-parameter affine model, the 4-parameter affine model, or another affine model may be used.

In some embodiments, for the MVs above the current CTU-row, the MVs of the row above the current CTU and the right CTUs, and the MVs within the current CTU row may be used. The MV in the top-left CTUs are not used. In some embodiments, if the reference block is in the above CTU or the above-right CTUs, the 4-parameter affine model is used. If the reference block is in the top-left CTU, the affine model is not used. Otherwise, the 6-parameter affine model, the 4-parameter affine model, or another affine model may be used. In some embodiments, MVs in the top-left CTUs, above CTU, and above-right CTU are not used. In other words, the MVs in the upper CTU are not used to derive the inherited affine candidate. However, the MV in the above CTU-row are used to derive the affine corner candidate. In some embodiments, the CUs in the above CTU-row is used to derive the affine candidate if the 4-parameter affine model is used for the CU. Otherwise, the affine candidate is not derived from the CU.

In some embodiments, the particular region of the line buffer may include the current CTU and the left CTU. The MVs in current CTU, the MVs of the left CTU, and one MV row above current CTU, left CTU and right CTUs may be used. In some embodiments, the top-left neighboring CU of the current CTU is not used for deriving the affine parameter. In some embodiments, if the reference block is in the above CTU row, the 4-parameter affine model is used. Otherwise, the 6-parameter affine model, the 4-parameter affine model, or another affine model may be used.

In some embodiments, the particular region of the line buffer may be the current CTU. The MVs in the current CTU, the MVs of the left column of the current CTU, and the MVs of the row above the current CTU may be used for deriving the affine parameters. In some embodiments, the MVs of the row above the CTU to the right may also be used. In some embodiments, the top-left neighboring CU of the current CTU is not used for deriving the affine parameter. In some embodiments, if the reference block is in the above CTU row or in the left CTU, the 4-parameter affine model is used. If the reference block is in the top-left CTU, the affine model is not used. Otherwise, the 6-parameter affine model or 4-parameter affine or other affine model may be used. In some embodiments, the MVs in the current CTU may be used, but the MVs in left CTU, top-left CTUs, above CTU, and above-right CTUs are not used. In other words, the MVs not in the current CTU are not used to derive the inherited affine candidate. In some embodiments, the CU in the above CTU-row and the left CTU may be used to derive the affine candidate if the 4-parameter affine model is used for the CU. Otherwise, the affine candidate is not derived from the CU. The MV in the upper CTU row and in the left CTU may be used to derive the corner derived affine candidate. In some embodiments, the MVs in the current CTU and the MVs of the left column of the current CTU may be used. The MVs in top-left CTUs, above CTU, and above-right CTUs are not used. The CU in the above CTU row may not bra used for affine candidate derivation. The MV in the MVs of the left column of the current CTU may use to derive the 4-parameter affine candidate. The MV in the upper CTU row may be used to derive the corner derived affine candidate.

In some embodiments, the MVs of the current CTU, the MVs of the column left of the current CTU, the MVs of the row above the current CTU, and the top-left neighboring MV of the current CTU may be used for deriving the affine parameters. The MVs of the row above the right CTUs may also be used. In some embodiments, the MVs of the row above the left CTU are not available. In some embodiments, the MVs of the row above the left CTU except the top-left neighboring MV of the current CTU are not available. In some embodiments, if the reference block is in the above CTU row or in the left CTU, the 4-parameter affine model is used. Otherwise, the 6-parameter affine model, the 4-parameter affine model, or another affine model can be used. In some embodiments, the MVs in the current CTU, the MVs of the left column of the current CTU, the MVs of the row above the current CTU, and the top-left neighboring MV of the current CTU may be used for deriving the affine parameters. The MVs of the row above the right CTUs and the MVs of the row above the left CTU may also be used. In some embodiments, the top-left neighboring CU of the current CTU are not used for deriving the affine parameter. In some embodiments, the MVs in the current CTU, the MVs of the left column of the current CTU, the MVs of the row above the current CTU may be used for deriving the affine parameters. The MVs of the row above the right CTUs but excluding the MVs of the row above the left CTUs may also be used. In some embodiments, the top-left neighboring CU of the current CTU are not used for deriving the affine parameter.

In some embodiments, the particular region of the line buffer may be a 64×64 block or a block with size equal to maximum TU size. For example, the region can be the current 64×64 block. The MVs in the current 64×64 block, the MVs of the left column of the current 64×64 block, and the MVs of the row above the current 64×64 block may be used for deriving the affine parameters. The MVs of the row above the right 64×64 block may also be used. In some embodiments, the top-left neighboring CU of the current 64×64 block is not used for deriving the affine parameter. In some embodiments, if the reference block is in the above 64×64 block row or in the left 64×64 block, the 4-parameter affine model is used. If the reference block is in the top-left 64×64 block, the affine model is not used. Otherwise, the 6-parameter affine model, the 4-parameter affine model, or another affine model may be used. In some embodiments, the MVs in the current 64×64 block may be used, but the MVs in left 64×64 block, top-left 64×64 block, above 64×64 block, and above-right 64×64 blocks are not used. In other words, the MVs not in the current 64×64 block are not used to derive the inherited affine candidate. In some embodiments, the CU in the above 64×64 block-row and the left 64×64 block may be used to derive the affine candidate if the 4-parameter affine model is used for the CU. Otherwise, the affine candidate is not derived from the CU. The MV in the upper 64×64 block row and in the left 64×64 block may be used to derive the corner derived affine candidate. In some embodiments, the MVs in the current 64×64 block and the MVs of the left column of the current 64×64 block may be used. The MVs in top-left 64×64 blocks, above 64×64 block, and above-right 64×64 blocks are not used. The CU in the above 64×64 block row is not used for affine candidate derivation. The MVs of the left column of the current 64×64 block may be used to derive the 4-parameter affine candidate. The MV in the upper 64×64 block row may be used to derive the corner derived affine candidate.

In some embodiments, two neighboring MVs are used to derive the 4-parameter affine candidate. In some embodiments, the two neighboring MVs and one additional MV are used to derive the 6-parameter affine candidates. The additional MV can be one of the neighboring MVs or one of the temporal MVs. In some embodiments, 4- or 6-parameter affine candidate is derived depends on the affine mode and or the neighboring CUs. For example, in affine AMVP mode, one flag or one syntax (CU-level or slice/picture/sequence-level) is derived or signaled to indicate the 4 or 6-parameter are used. If 6-parameter affine mode is used and not all CPMVs of the reference block are available, (e.g. when the reference block is in above CTU row), the two neighboring MVs and one additional MV are used to derive the 6-parameter affine candidate. If the 6-parameter affine mode is used and all CPMVs of the reference block are available, e.g. the reference block is in the current CTU, the three control points MVs of the reference block may be used to derive the 6-parameter affine candidate.

In some embodiments, the 4-parameter affine candidate is used for affine merge mode or affine AMVP MVP derivation. In some embodiments, the 6-parameter affine candidate is used for affine merge mode. In some embodiments, the 6-parameter affine candidate is used when the referencing affine coded block is coded in 6-parameter affine mode (e.g. 6-parameter affine AMVP mode or merge mode). The 4-parameter affine candidate is used when the referencing affine coded block is coded in 4-parameter affine mode. For deriving the 6-parameter affine candidate, if not all control point MVs of the reference block are available, e.g. the reference block is in above CTU row, the two neighboring MVs and one additional MV are used to derive the 6-parameter affine candidate. If all control point MVs of the reference block are available, e.g. the reference block is in current CTU, the three control points MVs of the reference block are used to derive the 6-parameter affine candidate.

In some embodiments, the additional MV is from the neighboring MVs. For example, if the MVs of the above CU are used, the MV of the bottom-left neighboring MV may be used to derive the 6-parameter affine mode. In some embodiments, the bottom-left MV may be the first available MV of {C0→C1} or {C1→C0}, or the first available MV of {C0→C1} or {C1→C0} with the same reference index/ picture with the neighboring affine MV. If the MVs of the left CU are used, the MV of the top-right neighboring MV may be used to derive the 6-parameter affine mode. In some embodiments, the bottom-left MV may be the first available MV of {B0→B1} or {B1→B0}, or the first available MV of {B0→B1} or {B1→B0} with the same reference index/ picture with the neighboring affine MV. For example, in FIG. 11, if the two neighboring MVs are $V_{B2}$ and $V_{B3}$, the additional MV may be one neighboring MV in the bottom-left corner, e.g. $V_{A3}$ or D. In another example, if the two neighboring MVs are $V_{A1}$ and $V_{A3}$, the additional MV may be one neighboring MV in the bottom-left corner, e.g. $V_{B3}$ or the MV to the right of $V_{B3}$.

In some embodiments, the additional MV is from the temporal collocated MVs. In some embodiments, whether to use the spatial neighboring MV or to use the temporal collocated MV is determined based on the spatial neighboring and/or the temporal collocated block. In some embodiments, if the spatial neighboring MV is not available, the temporal collocated block is used. In some embodiments, if the temporal collocated MV is not available, the spatial neighboring block is used.

II. Control Point Position

Figure 4:
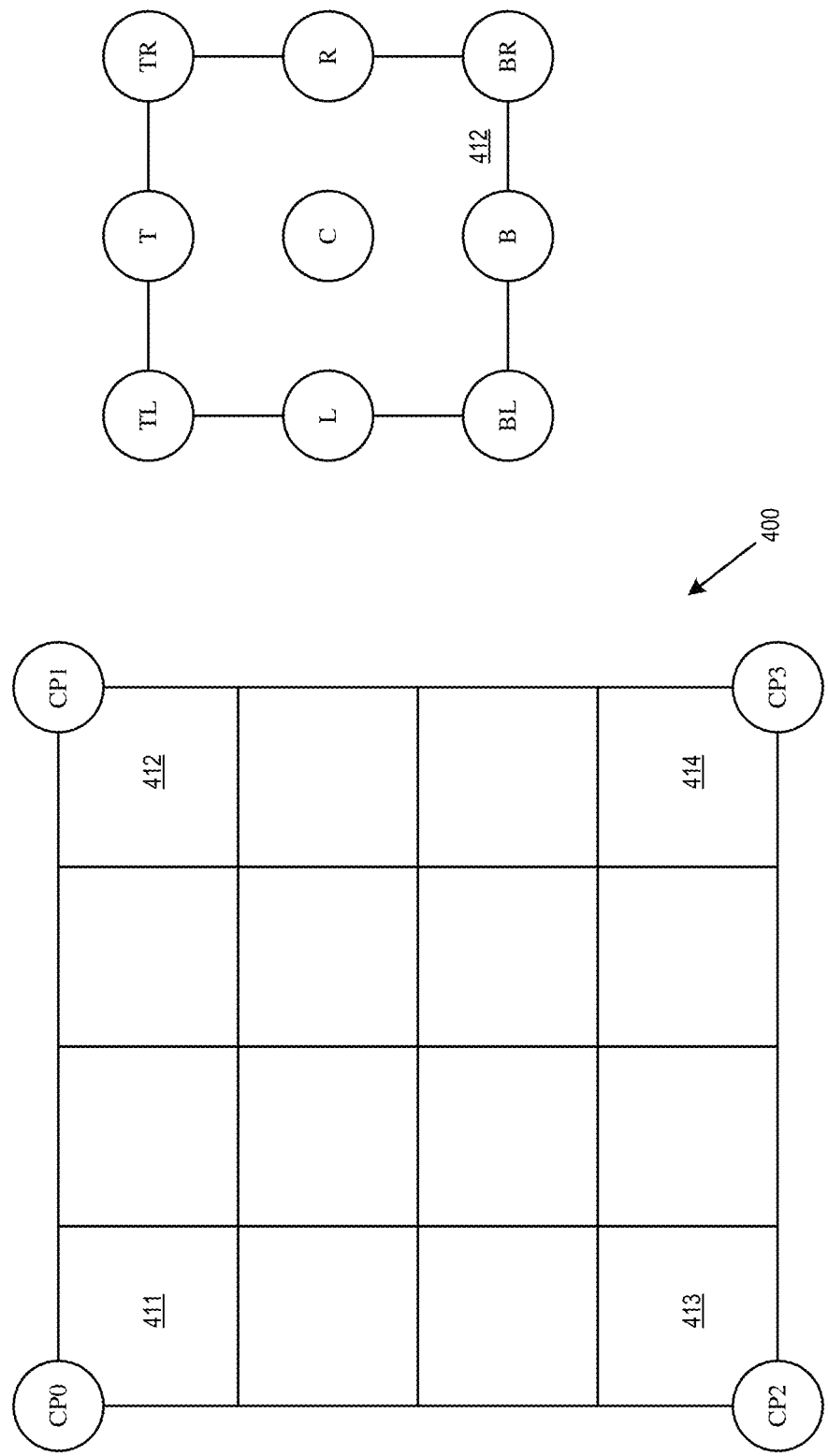
FIG. 4 illustrates control point positions in a corner sub-block of a block.

In affine motion modeling, the MV of each sample or each sub-block may be derived from the control point MVs (CPMVs). The control points may be positioned at the four corners of the current block, which may be divided into several sub-blocks. FIG. 4 illustrates control point positions in a corner sub-block of a block.

As illustrated, a block of pixels 400 has four control point positions at four corners of the block. The block 400 is also divided into 16 sub-blocks, including corner sub-blocks 411-414. The top-left control point (CP0) is at the top-left corner of the top-left sub-block 411. The top-right control point (CP1) is at the top-right corner of the top-right sub-block 412. The bottom-left control point (CP2) is at the bottom-left corner of the bottom-left sub-block 413. The bottom right control point (CP3) is at the bottom-right corner of the bottom-right sub-block 414.

In some embodiments, a control point may be located at positions other than the corners of the corner sub-blocks. In the figures, the possible control point positions of a corner sub-block (e.g., sub-block 412) are labeled as TL (top-left), T (top-center), TR (top-right), R (right-center), BR (bottom-right), B (bottom-center), BL (bottom-left), L (left-center), and C (center).

In some embodiments, the position of the control points of the current block and the position of the control points of the reference block may be different. For example, the control points of the current block may be at C positions of corner sub-blocks, while control points of the reference block may be L, R, T, or B. In some embodiments, control points of the current block and the reference block are chosen to avoid dividing a non-power of two value in CPMV derivation. In some embodiments, L or R positions are chosen as control points for a reference block that is the above neighbor of the current block, while T or B positions are chosen as control points for a reference block that is the left neighbor of the current block.

III. Storing MVs of Corner Sub-Blocks.

In some embodiments, for corner sub-blocks of an affine coded block, the same MV is used as the stored CPMV (for the neighboring block referencing) and the MCMV (for the motion compensation of the corner sub-blocks). In some embodiments, all sub-blocks in the affine coded block use the same MV as the stored CPMV and the MCMV. The MCMVs for the four corner sub-blocks are not re-derived, and there is no additional MV storage for the four corner sub-blocks.

In some embodiments, an MCMV as a representative MV is stored in the MV buffer instead of CPMVs for the four corner sub-blocks of the current block. The corresponding affine MV derivation is modified to account for the fact that the denominator of the scaling factor in affine MV derivation is not power of 2 values when the position of the representative MV is in the center position of the sub-block rather than at the corner of the block.

In some embodiments, the representative MVs are the same as the CPMVs. For example, for some or all of four corner sub-blocks, the CPMVs are stored in the MV buffer. The stored CPMVs are used for the motion compensation of some or all of four corner sub-block. For example, if the CPMVs are the MVs at the four corner samples of the current block and the representative MVs are the MVs at the center positions of the four corner sub-blocks, for some or all of four corner sub-blocks, the CPMVs are used for motion compensation of the corner sub-blocks and also used as the reference MVs for the neighboring blocks.

In some embodiments, different types of MVs are used for MV signaling and MVP derivation and for motion compensation and storage. For example, if the MCMVs of the four corner sub-block are stored, the CPMVs of some corners of the current block are used to derive affine MVPs (e.g. affine MVP candidates and/or affine merge candidates) for the current block. For affine AMVP mode MV/MV difference/MVP signaling, the corner CPMVs of the current block are used. For affine merge mode, the CPMV candidates of the current block are derived (encoded/decoded/parsed/reconstructed). The CPMVs are not stored in the MV buffer for the corner sub-blocks. From the reconstructed CPMVs, the representative MV of each sub-block is derived and stored. The representative MVs are used for MV/MVP derivation and MV coding of neighboring block and collocated blocks, and also used for the motion compensation of the sub-blocks. In some embodiments, the representative MVs of neighboring blocks are used to derive the CPMVs of the current block. In other words, the representative MVs of current block are used to derive the CPMVs of the following neighboring block.

In some embodiment, the representative MVs (e.g. the MVs at the center positions of sub-blocks) of some corner sub-blocks of the current block are used to derive affine MVPs (e.g. affine merge candidates or affine AMVP MVP candidates). The affine merge candidates and the affine AMVP signaled MVs (e.g. MVP plus MVD) may be stored in the corner sub-blocks of the current block in the MV buffer. From the representative MVs of the corner sub-blocks, the representative MVs of the sub-blocks are derived and stored. The representative MVs are used for MV/MVP derivation and MV coding of neighboring block and collocated blocks, and also used for the motion compensation of the sub-blocks. The same kind of MVs are used for MV signaling, MVP derivation, motion compensation, and storage.

In some embodiments, the MVs of the corner samples in the corner sub-block (e.g., CPMVs) are stored and used for motion compensation. In some embodiments, the CPMVs of four corners are derived and stored, regardless of which affine model is used. In some embodiments, the top-left and top-right corner control points MVs are derived and stored when 4-parameter affine model is used, and the top-left, top-right, and bottom-left (or bottom-right) corner control points MVs are derived and stored when 6-parameter affine model is used. In some embodiments, if the current CU is the bottom CU of a CTU, the bottom-left and bottom-right corner control points are also derived and stored. In some embodiments, the derived and stored CPMVs are used for motion compensation of the corner blocks, and also are used as the reference MV of the neighboring blocks. The derived control points MVs or the affine parameters may be used for inter mode coding as the MVP or the merge mode coding as the affine merge candidates.

As mentioned, in some embodiments, the CPMVs are stored in a buffer (e.g., the first buffer #0130) that is separate from the buffer that stores MCMVs (e.g., the second buffer #0140). In some embodiments, CPMVs of a CTU are stored in the next CTU row. In some embodiments, a line buffer is used to store the CPMVs at the bottom of the CTU row or the CPMVs of the CUs at the bottom of the CTU row.

In some embodiments, to reduce the line buffer size for CPMVs, for the last N×N (e.g., 4×4) block (or sub-block) of a CTU, the stored MCMVs in some positions (e.g. the bottom-left and/or the bottom-right sub-block of the neighboring CU) are used to derive the affine MV predictor when being referenced by blocks in a different region. The particular region can be a CTU, a CTU-row, a tile boundary, an M×N block, or a slice. The M×N block can be 64×64 block, or a block that size is the same as the maximum TU size. In this way, no additional storage (e.g. line buffer) is required to store the CPMVs at the bottom of the CTU row or the CPMVs of the CUs at the bottom of the CTU row.

In one embodiment, only the MCMVs in the last row of one CTU are stored in the line buffer. Therefore, when the reference MVs of the current CU located in the above CTU row, only the MVs in the line buffer can be used. In another word, when the reference MVs of the current CU located in the above CTU row, only the MCMVs in the last row of one CTU can be used. If the MVs are referenced for affine MVP derivation of inherited affine candidates, the MCMVs are used (e.g. treated as CPMVs). In one embodiment, the CPMV position of the reference block is changed to the positions in the last row of the reference block. In one embodiment, the new positions are the bottom-left corner and bottom-right corner.

In some embodiments, to reduce the line buffer size for CPMVs, for the last N×N (e.g., 4×4) block (or sub-block) of a CTU, the stored MCMV is replaced by the CPMV. Therefore, no additional storage (e.g. line buffer) is required to store the CPMVs at the bottom of the CTU row or the CPMVs of the CUs at the bottom of the CTU row. In some embodiments, the replacement is performed at CTU-level (e.g. perform at the end of a CTU). Specifically, when a CU within the CTU is coded by the normal merge candidate derivation or by normal inter mode AMVP candidate derivation, the MCMV is referenced if the control point sub-block (e.g. the corner sub-block of the CU in the last row of the CTU) is used. For example, for CTU at the right of the current CTU, if some CU references the bottom-right MV of the current CTU, the MCMV is used. In some embodiments, the CPMV is used. In some embodiments, the replacement of MCMVs by CPMVs is performed at CU-level (e.g. perform at the end of CU). Specifically, when a CU within the CTU is coded by the normal merge candidate derivation or by normal inter mode AMVP candidate derivation, the CPMV is referenced if the control point sub-block is used. For the CU in the below CTU row, the CPMVs are referenced since the MCMV are replaced by the CPMVs.

IV. Control Point Selection

In general, for 4-parameter affine model, the top-left and top-right corners of the reference block are selected as control points for CPMVs. For 6-parameter affine model, the top-left, top-right, and bottom-left corners of the reference block are selected as control points for CPMVs. However, in some embodiments, in order to reduce storage usage for storing CPMVs or to improve the efficiency of the derived affine model, the bottom-right corners of the reference block are selected as the first control point for CPMV. In order to have a unified control point selection scheme, the video coder in some embodiments use the bottom-left and bottom-right corners as control points for CPMV for 4-parameter affine model, and to use the bottom-left, bottom-right, and top-right (or top-left) corners as control points for CPMV for 6-parameter affine model. Furthermore, in some embodiments, the bottom-right corner CPMV is always used regardless of the affine model used. In some embodiments, the bottom-right and bottom-left CPMVs are stored in a buffer. In some embodiments, the bottom-right and top-right CPMVs are stored in a buffer.

In some embodiments, the referenced bottom-left and bottom-right corner CPMVs or the referenced bottom-left, bottom-right, and top-right (or top-left) corner CPMVs are used to derive the bottom-left and bottom-right corner CPMVs of the current block, or the bottom-left, bottom-right, and top-right (or top-left) corner CPMVs of the current block.

In some embodiments, the referenced bottom-left and bottom-right corner CPMVs or the referenced bottom-left, bottom-right, and top-right (or top-left) corner CPMVs are used to derive the top-left and top-right corner CPMVs of the current block or the top-left, top-right, and bottom-right (or bottom-left) corner CPMVs of the current block. The bottom-left and bottom-right corner CPMVs of the current block or the bottom-left, bottom-right, and top-right (or top-left) corner CPMVs of the current block are derived and stored.

In some embodiments, for affine AMVP mode coding, the CPMVs of the bottom-left and bottom-right corners of the current block or the CPMVs of the bottom-left, bottom-right, and top-right (or top-left) corners of the current block are signaled in AMVP mode.

V. Deblocking and OBMC

In deblocking process, the boundaries are filtered at block level, e.g., at boundaries of CU, PU, or TU. However, for a block of pixels that is coded by affine prediction, the affine model is applied to each sub-block. The MVs of different sub-blocks may be different. In some embodiments, the video coder performs deblocking on the sub-block boundaries of an affine coded block. For the affine sub-block boundary, a weak deblocking filter or a boundary filter with smaller boundary strength (e.g. less than the maximum boundary strength) may be used.

In some embodiments, when the MCMVs are stored in the second storage (or the MV buffer, or the second buffer 140) and the CPMVs are stored in the first storage (or first buffer 130), the MCMVs stored in the MV buffer is used for OBMC and/or deblocking.

In some embodiments, for each of the corner sub-blocks, if the MV used for motion compensation (e.g., MCMV) is different than the MV stored in the MV buffer (such as when the MV buffers stores CPMV rather MCMV for the corner sub-blocks), then the MV used for motion compensation is also used for deblocking. In some embodiments, the MV stored in MV buffer is used for deblocking.

When overlapped block motion compensation (OBMC) is used to filter the boundaries of the current block, the MVs of the neighboring blocks are used to compensate the block artifact of the current block and the neighboring blocks. If the neighboring block is an affine coded block, and if the MV for motion compensation and the MV stored in the MV buffer are different than the MV stored in the MV buffer (such as when the MV buffers stores CPMV rather MCMV for the corner sub-blocks), in some embodiments, the MV for motion compensation is used for OBMC. In some embodiments, the MV stored in the MV buffer is used for OBMC.

VI. Affine Merge/Inter Mode Constraint

In some embodiments, the affine merge and affine inter mode are enabled or disabled based on constraints on size, width, or height. For example, both affine merge mode and affine inter mode are disabled when the block size (e.g., CU area) is less than 64, 128, or 256. In some embodiments, both affine merge mode and affine inter mode are disabled when the block width is less than 8 or when the block height is less than 8.

VII. Example Video Encoder

Figure 5:
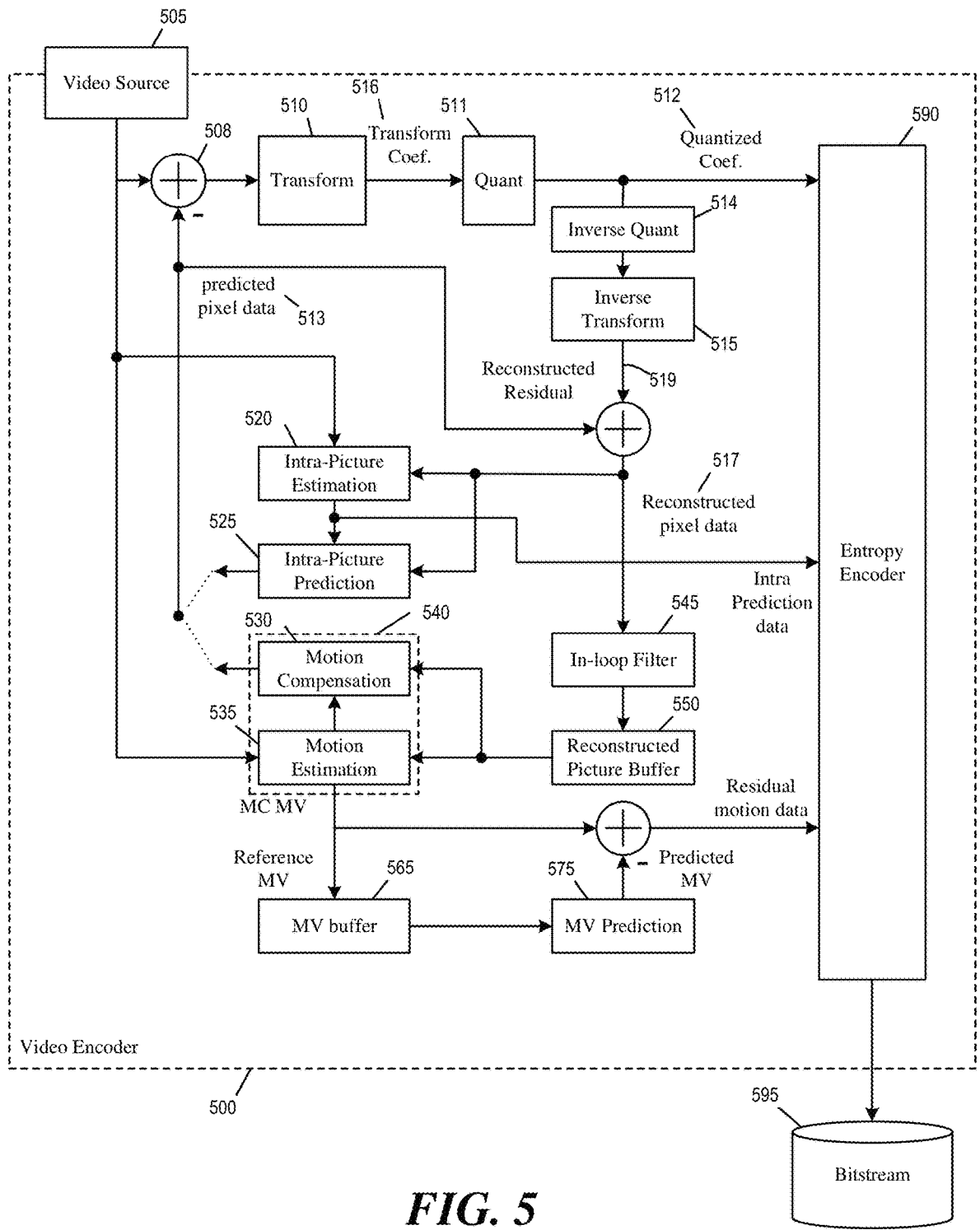
FIG. 5 illustrates an example video encoder that may implement motion prediction based on affine transformation or affine motion.

FIG. 5 illustrates an example video encoder 500 that may implement motion prediction based on affine transformation or affine motion. As illustrated, the video encoder 500 receives input video signal from a video source 505 and encodes the signal into bitstream 595. The video encoder 500 has several components or modules for encoding the signal from the video source 505, including a transform module 510, a quantization module 511, an inverse quantization module 514, an inverse transform module 515, an intra-picture estimation module 520, an intra-prediction module 525, a motion compensation module 530, a motion estimation module 535, an in-loop filter 545, a reconstructed picture buffer 550, a MV buffer 565, and a MV prediction module 575, and an entropy encoder 590. The motion compensation module 530 and the motion estimation module 535 are part of an inter-prediction module 540.

In some embodiments, the modules 510-590 are modules of software instructions being executed by one or more processing units (e.g., a processor) of a computing device or electronic apparatus. In some embodiments, the modules 510-590 are modules of hardware circuits implemented by one or more integrated circuits (ICs) of an electronic apparatus. Though the modules 510-590 are illustrated as being separate modules, some of the modules can be combined into a single module.

The video source 505 provides a raw video signal that presents pixel data of each video frame without compression. A subtractor 508 computes the difference between the raw video pixel data of the video source 505 and the predicted pixel data 513 from the motion compensation module 530 or intra-prediction module 525. The transform module 510 converts the difference (or the residual pixel data or residual signal 509) into transform coefficients (e.g., by performing Discrete Cosine Transform, or DCT). The quantization module 511 quantizes the transform coefficients into quantized data (or quantized coefficients) 512, which is encoded into the bitstream 595 by the entropy encoder 590.

The inverse quantization module 514 de-quantizes the quantized data (or quantized coefficients) 512 to obtain transform coefficients, and the inverse transform module 515 performs inverse transform on the transform coefficients to produce reconstructed residual 519. The reconstructed residual 519 is added with the predicted pixel data 513 to produce reconstructed pixel data 517. In some embodiments, the reconstructed pixel data 517 is temporarily stored in a buffer (not illustrated) for intra-picture prediction and spatial MV prediction. The buffer may also store motion information for blocks or sub-blocks to the left of or above the current block.

The reconstructed pixels are filtered by the in-loop filter 545 and stored in the reconstructed picture buffer 550. In some embodiments, the reconstructed picture buffer 550 is a storage external to the video encoder 500. In some embodiments, the reconstructed picture buffer 550 is a storage internal to the video encoder 500.

The intra-picture estimation module 520 performs intra-prediction based on the reconstructed pixel data 517 to produce intra prediction data. The intra-prediction data is provided to the entropy encoder 590 to be encoded into bitstream 595. The intra-prediction data is also used by the intra-prediction module 525 to produce the predicted pixel data 513.

The motion estimation module 535 performs inter-prediction by producing MVs to reference pixel data of previously decoded frames stored in the reconstructed picture buffer 550. These MVs are provided to the motion compensation module 530 to produce predicted pixel data.

Instead of encoding the complete actual MVs in the bitstream, the video encoder 500 uses MV prediction to generate predicted MVs, and the difference between the MVs used for motion compensation and the predicted MVs is encoded as residual motion data and stored in the bitstream 595.

The MV prediction module 575 generates the predicted MVs based on reference MVs that were generated for encoding previously video frames, i.e., the motion compensation MVs that were used to perform motion compensation. The MV prediction module 575 retrieves reference MVs from previous video frames from the MV buffer 565. The video encoder 500 stores the MVs generated for the current video frame in the MV buffer 565 as reference MVs for generating predicted MVs.

The MV prediction module 575 uses the reference MVs to create the predicted MVs. The predicted MVs can be computed by spatial MV prediction or temporal MV prediction. The difference between the predicted MVs and the motion compensation MVs (MC MVs) of the current frame (residual motion data) are encoded into the bitstream 595 by the entropy encoder 590.

The entropy encoder 590 encodes various parameters and data into the bitstream 595 by using entropy-coding techniques such as context-adaptive binary arithmetic coding (CABAC) or Huffman encoding. The entropy encoder 590 encodes various header elements, flags, along with the quantized transform coefficients 512, and the residual motion data as syntax elements into the bitstream 595. The bitstream 595 is in turn stored in a storage device or transmitted to a decoder over a communications medium such as a network.

The in-loop filter 545 performs filtering or smoothing operations on the reconstructed pixel data 517 to reduce the artifacts of coding, particularly at boundaries of pixel blocks. In some embodiments, the filtering operation performed includes sample adaptive offset (SAO). In some embodiments, the filtering operations include adaptive loop filter (ALF).

Figure 6:
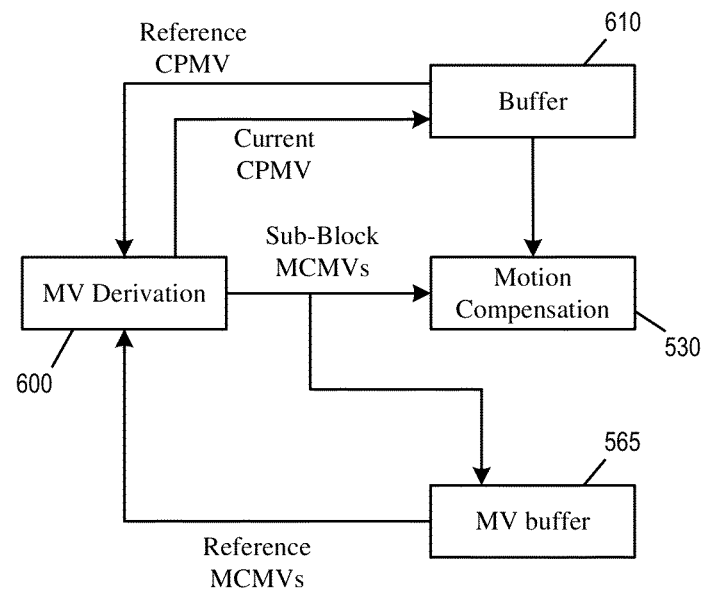
FIG. 6 illustrates portions of the video encoder that implement affine prediction by separately storing CPMVs and MCMVs.
Figure 6:
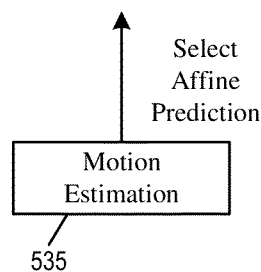

FIG. 6 illustrates portions of the video encoder 500 that implement affine prediction by separately storing CPMVs and MCMVs. Specifically, the figure illustrates the data flow between the components of the inter-prediction module 540 when the current block is being encoded by affine prediction (e.g. as part of affine merge mode or affine inter mode). As illustrated, the motion estimation module 535 as part of a rate-distortion operation determines to encode the current block by affine prediction.

An MV derivation module 600 computes a set of MCMVs for the motion compensation module 530 to perform motion compensation for the sub-blocks of the current block. The MV derivation module 600 retrieves reference CPMVs from the buffer 610 and reference MCMVs from the MV buffer 565. The MV derivation module 600 uses the retrieved reference CPMVs and/or the retrieved referenced MCMVs to determine the CPMVs of the current block. The determined CPMVs of the current block are in turn used to determine MCMVs (of the sub-blocks) of the current block according to an affine model.

The MCMVs stored in the MV buffer 565 are MCMVs used for motion compensation of previously coded blocks, which may or may not be neighboring blocks of the current block. The CPMVs stored in the buffer 610 are MVs that are used to perform affine predictions of previously coded blocks. The buffer 610 stores motion information for only blocks or sub-blocks that are immediate neighbors of the current block or are in a particular region of the current video picture relative to the current block (e.g., the current CTU row).

As the current block is being encoded, the MCMVs that were used for motion compensation of the current block are stored in the MV buffer 565. The CPMVs that were used to derive the MCMVs of the current block are stored in the buffer 610.

VIII. Example Video Decoder

Figure 7:
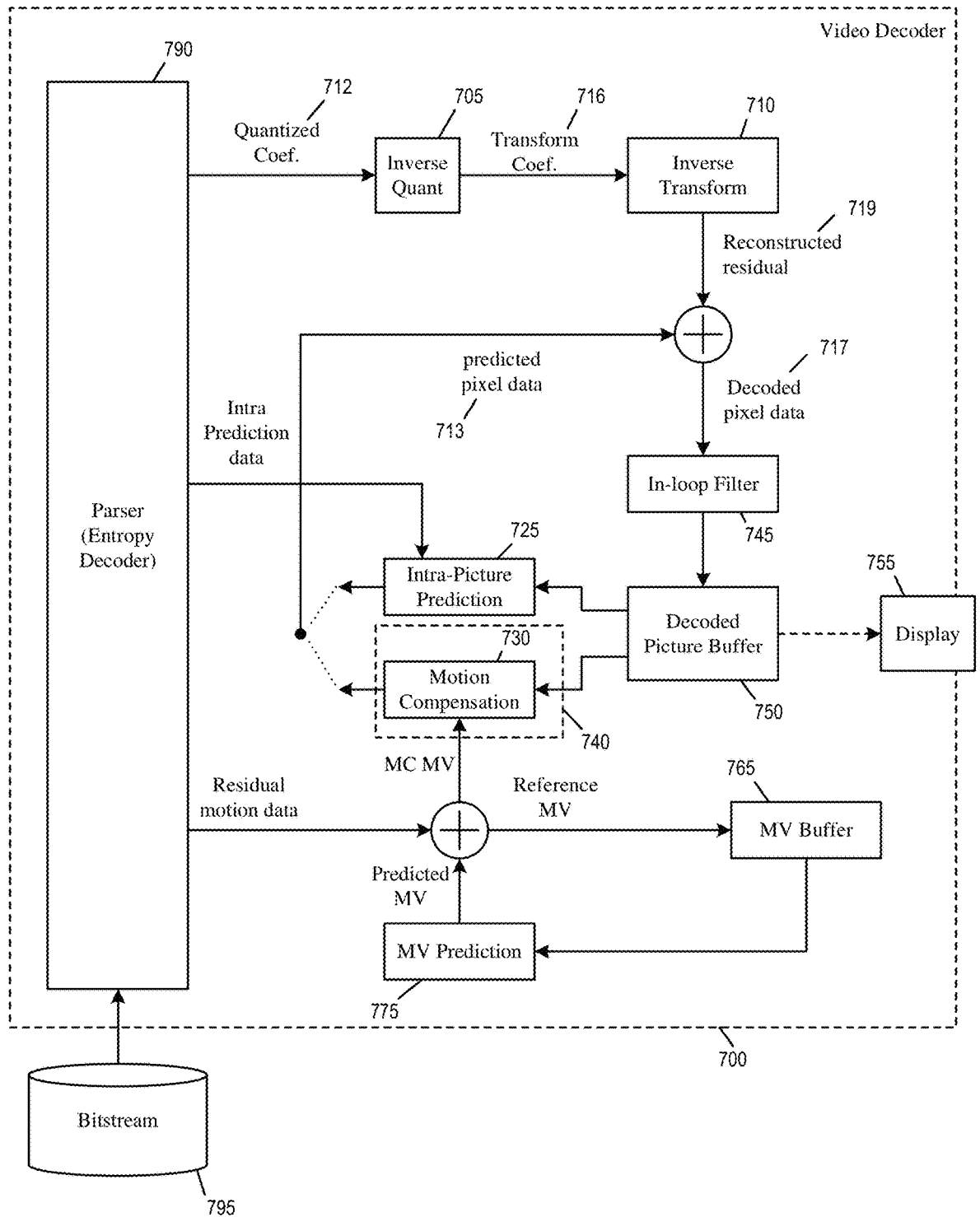
FIG. 7 illustrates an example video decoder that may implement motion prediction based on affine transformation or affine motion.

FIG. 7 illustrates an example video decoder 700 that may implement motion prediction based on affine transformation or affine motion. As illustrated, the video decoder 700 is an image-decoding or video-decoding circuit that receives a bitstream 795 and decodes the content of the bitstream into pixel data of video frames for display. The video decoder 700 has several components or modules for decoding the bitstream 795, including an inverse quantization module 705, an inverse transform module 710, an intra-prediction module 725, a motion compensation module 730, an in-loop filter 745, a decoded picture buffer 750, a MV buffer 765, a MV prediction module 775, and a parser 790. The motion compensation module 730 is part of an inter-prediction module 740.

In some embodiments, the modules 710-790 are modules of software instructions being executed by one or more processing units (e.g., a processor) of a computing device. In some embodiments, the modules 710-790 are modules of hardware circuits implemented by one or more ICs of an electronic apparatus. Though the modules 710-790 are illustrated as being separate modules, some of the modules can be combined into a single module.

The parser 790 (or entropy decoder) receives the bitstream 795 and performs initial parsing according to the syntax defined by a video-coding or image-coding standard. The parsed syntax element includes various header elements, flags, as well as quantized data (or quantized coefficients) 712. The parser 790 parses out the various syntax elements by using entropy-coding techniques such as context-adaptive binary arithmetic coding (CABAC) or Huffman encoding.

The inverse quantization module 705 de-quantizes the quantized data (or quantized coefficients) 712 to obtain transform coefficients, and the inverse transform module 710 performs inverse transform on the transform coefficients 716 to produce reconstructed residual signal 719. The reconstructed residual signal 719 is added with predicted pixel data 713 from the intra-prediction module 725 or the motion compensation module 730 to produce decoded pixel data 717. The decoded pixels data are filtered by the in-loop filter 745 and stored in the decoded picture buffer 750. In some embodiments, the decoded picture buffer 750 is a storage external to the video decoder 700. In some embodiments, the decoded picture buffer 750 is a storage internal to the video decoder 700.

The intra-prediction module 725 receives intra-prediction data from bitstream 795 and according to which, produces the predicted pixel data 713 from the decoded pixel data 717 stored in the decoded picture buffer 750. In some embodiments, the decoded pixel data 717 is also stored in a buffer (not illustrated) for intra-picture prediction and spatial MV prediction.

In some embodiments, the content of the decoded picture buffer 750 is used for display. A display device 755 either retrieves the content of the decoded picture buffer 750 for display directly, or retrieves the content of the decoded picture buffer to a display buffer. In some embodiments, the display device receives pixel values from the decoded picture buffer 750 through a pixel transport.

The motion compensation module 730 produces predicted pixel data 713 from the decoded pixel data 717 stored in the decoded picture buffer 750 according to motion compensation MVs (MC MVs). These motion compensation MVs are decoded by adding the residual motion data received from the bitstream 795 with predicted MVs received from the MV prediction module 775.

The MV prediction module 775 generates the predicted MVs based on reference MVs that were generated for decoding previous video frames, e.g., the motion compensation MVs that were used to perform motion compensation. The MV prediction module 775 retrieves the reference MVs of previous video frames from the MV buffer 765. The video decoder 700 stores the motion compensation MVs generated for decoding the current video frame in the MV buffer 765 as reference MVs for producing predicted MVs.

The in-loop filter 745 performs filtering or smoothing operations on the decoded pixel data 717 to reduce the artifacts of coding, particularly at boundaries of pixel blocks. In some embodiments, the filtering operation performed includes sample adaptive offset (SAO). In some embodiments, the filtering operations include adaptive loop filter (ALF).

Figure 8:
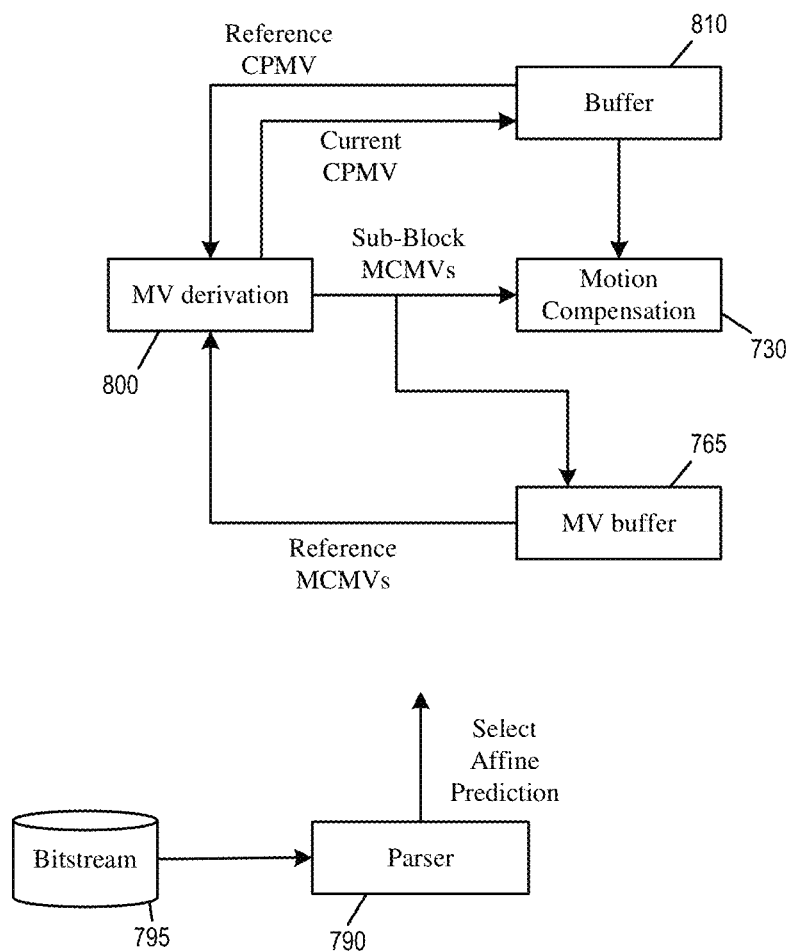
FIG. 8 illustrates portions of the video decoder that implement affine prediction by separately storing CPMVs and MCMVs.

FIG. 8 illustrates portions of the video decoder 700 that implement affine prediction by separately storing CPMVs and MCMVs. Specifically, the figure illustrates the data flow between the components of the inter-prediction module 740 when the current block is being decoded by affine prediction (e.g. as part of affine merge mode or affine inter mode). As illustrated, the parser 790 parses the bitstream 795, which signals that the current block is coded by affine prediction.

An MV derivation module 800 computes a set of MCMVs for the motion compensation module 730 to perform motion compensation for the sub-blocks of the current block. The MV derivation module 800 retrieves reference CPMVs from the buffer 810 and reference MCMVs from the MV buffer 765. The MV derivation module 800 uses the retrieved reference CPMVs and/or the retrieved referenced MCMVs to determine the CPMVs of the current block. The determined CPMVs of the current block are in turn used to determine MCMVs (of the sub-blocks) of the current block according to an affine model.

The MCMVs stored in the MV buffer 765 are MCMVs used for motion compensation of previously coded blocks, which may or may not be neighboring blocks of the current block. The CPMVs stored in the buffer 810 are MVs that are used to perform affine predictions of previously coded blocks. The buffer 810 stores motion information for only blocks or sub-blocks that that are immediate neighbors of the current block or are in a particular region of the current video picture relative to the current block (e.g., the current CTU row).

As the current block is being decoded, the MCMVs that were used for motion compensation of the current block are stored in the MV buffer 765. The CPMVs that were used to derive the MCMVs of the current block are stored in the buffer 810.

Figure 9:
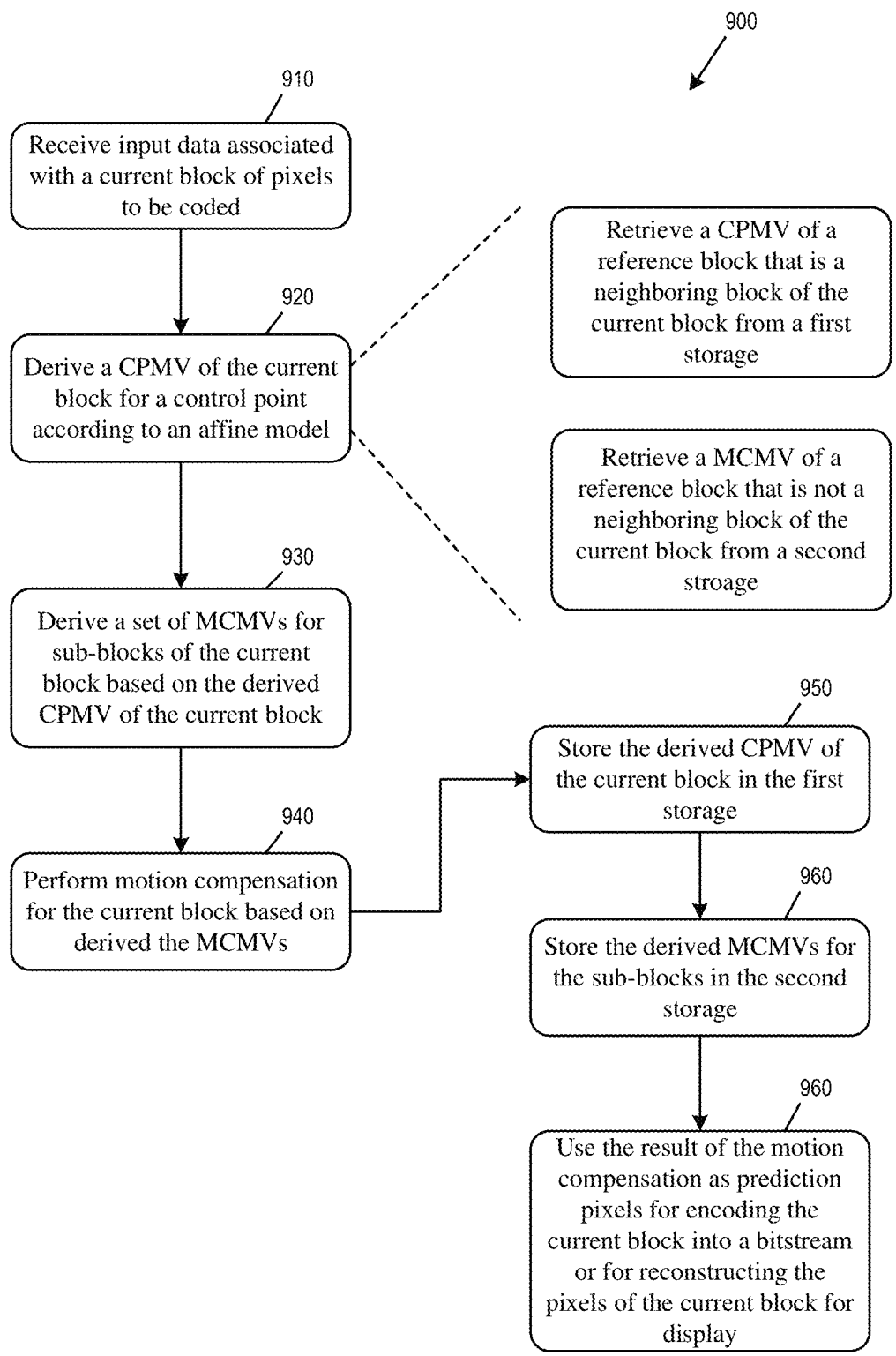
FIG. 9 conceptually illustrates a process that encodes or decodes a current block by affine prediction with CPMVs and MCMVs stored in separate storages.

FIG. 9 conceptually illustrates a process 900 that encodes or decodes a current block by affine prediction with CPMVs and MCMVs stored in separate storages. In some embodiments, one or more processing units (e.g., a processor) of a computing device implementing a video coder (e.g., the video encoder 500 or the video decoder 700) performs the process 900 by executing instructions stored in a computer readable medium. In some embodiments, an electronic apparatus implementing the video coder performs the process 900.

The video coder receives (at step 910) input data associated with a current block to be encoded or decoded. The current block may be a CU, PU, or CTU of a video picture in a video sequence. A video encoder may receive the block of pixels from a video source of the video sequence and encode the block of pixels as syntax elements of a bitstream. A video decoder may receive a bitstream that includes syntax elements that represents the encoded block of pixels and decode the bitstream to reconstruct the video picture and the video sequence.

The video coder derives (at 920) a CPMV of the current block for a control point according to an affine model. The video coder may derive the CPMV of the current block by retrieving a CPMV of a first reference block from a first storage when the first reference block is a neighboring block of the current block and/or by retrieving an MCMV of a second reference block from the second storage when the second reference block is not a neighboring block of the current block. The second storage may be a MV buffer of a video encoder (MV buffer 565) or of a video decoder (MV buffer 765).

A neighboring block may be a CU, PU, or a sub-block that is adjacent to the current block. In some embodiments, the CPMV of the current block is derived from a MCMV that is positioned near a center of a corner sub-block of the second reference block. In some embodiments, a block is a neighboring block located in the same region of the current block if it is in a same row of CTUs as the current block. In some embodiments, a block is a neighboring block located in the same region if it is a block or sub-block that is immediate to the left of or above the current block.

In some embodiments, the second storage may be a buffer that stores motion information associated with blocks immediately above a row of CTUs that includes the current block but does not store motion information associated with blocks that are not immediately above the row of CTUs. In some embodiments, the first storage is a buffer that stores motion information associated blocks immediately above the current block and immediately left of the current block. The second storage may also be a buffer whose motion information are updated by the motion information of the last row in each CTU.

The video coder derives (at step 930) a set of MCMV for sub-blocks of the current block based on the derived CPMV of the current block. The derivation of the MCMVs of the sub-blocks may be based on 4-parameter affine model (Eq. 1) or 6-parameter affine model (Eq. 3).

The video coder performs (at step 940) motion compensation for the current block based on derived the MCMVs. The video coder then stores (at step 950) the derived CPMV of the current block in the first storage and the stores (at step 960) MCMVs of the sub-blocks of the current block in the second storage.

The video coder uses (at step 970) the result of the motion compensation as prediction pixel values for encoding the current block into a bitstream (if encoding) or for reconstructing the pixels of the current block for display (if decoding). In some embodiments, when reconstructing the pixels of the current block, the video coder retrieves MCMVs of the current block from the second storage to filter boundaries between sub-blocks of the current block by performing deblocking or OBMC.

IX. Example Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random-access memory (RAM) chips, hard drives, erasable programmable read only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the present disclosure. In some embodiments, the software programs, when installed to operate on one or more electronic systems, define one or more specific machine implementations that execute and perform the operations of the software programs.

Figure 10:
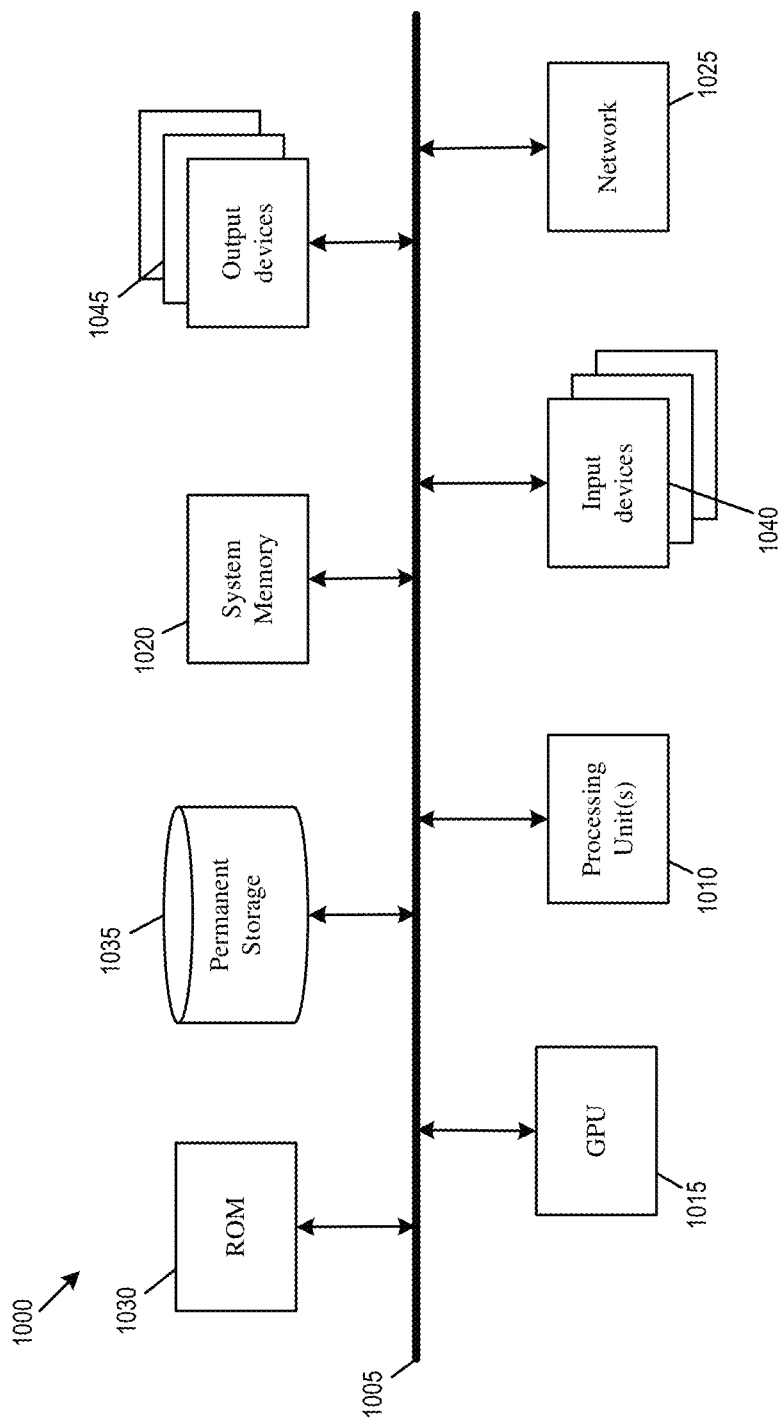
FIG. 10 conceptually illustrates an electronic system with which some embodiments of the present disclosure are implemented.

FIG. 10 conceptually illustrates an electronic system 1000 with which some embodiments of the present disclosure are implemented. The electronic system 1000 may be a computer (e.g., a desktop computer, personal computer, tablet computer, etc.), phone, PDA, or any other sort of electronic device. Such an electronic system includes various types of computer readable media and interfaces for various other types of computer readable media. Electronic system 1000 includes a bus 1005, processing unit(s) 1010, a graphics-processing unit (GPU) 1015, a system memory 1020, a network 1025, a read-only memory 1030, a permanent storage device 1035, input devices 1040, and output devices 1045.

The bus 1005 collectively represents all system, peripheral, and chipset buses that communicatively connect the numerous internal devices of the electronic system 1000. For instance, the bus 1005 communicatively connects the processing unit(s) 1010 with the GPU 1015, the read-only memory 1030, the system memory 1020, and the permanent storage device 1035.

From these various memory units, the processing unit(s) 1010 retrieves instructions to execute and data to process in order to execute the processes of the present disclosure. The processing unit(s) may be a single processor or a multi-core processor in different embodiments. Some instructions are passed to and executed by the GPU 1015. The GPU 1015 can offload various computations or complement the image processing provided by the processing unit(s) 1010.

The read-only-memory (ROM) 1030 stores static data and instructions that are used by the processing unit(s) 1010 and other modules of the electronic system. The permanent storage device 1035, on the other hand, is a read-and-write memory device. This device is a non-volatile memory unit that stores instructions and data even when the electronic system 1000 is off. Some embodiments of the present disclosure use a mass-storage device (such as a magnetic or optical disk and its corresponding disk drive) as the permanent storage device 1035.

Other embodiments use a removable storage device (such as a floppy disk, flash memory device, etc., and its corresponding disk drive) as the permanent storage device. Like the permanent storage device 1035, the system memory 1020 is a read-and-write memory device. However, unlike storage device 1035, the system memory 1020 is a volatile read-and-write memory, such a random access memory. The system memory 1020 stores some of the instructions and data that the processor uses at runtime. In some embodiments, processes in accordance with the present disclosure are stored in the system memory 1020, the permanent storage device 1035, and/or the read-only memory 1030. For example, the various memory units include instructions for processing multimedia clips in accordance with some embodiments. From these various memory units, the processing unit(s) 1010 retrieves instructions to execute and data to process in order to execute the processes of some embodiments.

The bus 1005 also connects to the input and output devices 1040 and 1045. The input devices 1040 enable the user to communicate information and select commands to the electronic system. The input devices 1040 include alphanumeric keyboards and pointing devices (also called "cursor control devices"), cameras (e.g., webcams), microphones or similar devices for receiving voice commands, etc. The output devices 1045 display images generated by the electronic system or otherwise output data. The output devices 1045 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 10, bus 1005 also couples electronic system 1000 to a network 1025 through a network adapter (not shown). In this manner, the computer can be a part of a network of computers (such as a local area network ("LAN"), a wide area network ("WAN"), or an Intranet, or a network of networks, such as the Internet. Any or all components of electronic system 1000 may be used in conjunction with the present disclosure.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, many of the above-described features and applications are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the present disclosure has been described with reference to numerous specific details, one of ordinary skill in the art will recognize that the present disclosure can be embodied in other specific forms without departing from the spirit of the present disclosure. In addition, a number of the figures (including FIG. 9) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the present disclosure is not to be limited by the foregoing illustrative details, but rather is to be defined by the appended claims.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method comprising:
   receiving input data associated with a current block of pixels to be coded;
   deriving a control point motion vector (CPMV) of the current block for a control point according to an affine model;
   deriving a set of motion compensation motion vectors (MCMVs) for a set of sub-blocks of the current block based on the derived CPMV of the current block according to the affine model;
   performing motion compensation for the current block based on the derived set of MCMVs; and
   storing the derived CPMV of the current block in a first storage and the derived MCMVs for the set of sub-blocks in a second, different storage,
   wherein motion information stored in the second storage is associated with the set of sub-blocks of the current block, blocks immediately above the current block, or blocks immediately left of the current block, and
   wherein deriving the CPMV of the current block comprises:
     identifying a reference block of the current block;
     retrieving a CPMV of the reference block when the reference block and the current block are located in a same row of coding tree units (CTUs); and
     retrieving a MCMV of the reference block when the reference block and the current block are not located in the same row of CTUs.

2. The method of claim 1, wherein the CPMV stored in the first storage is used to derive an affine candidate, and wherein the set of MCMVs stored in the second storage are used to derive non-affine candidates.

3. The method of claim 1, further comprising retrieving MCMVs of the current block from the second storage and using the retrieved MCMVs to filter boundaries between sub-blocks of the current block.

4. The method of claim 1, further comprising retrieving MCMVs of the current block or a neighboring block of the current block from the second storage and using the retrieved MCMVs to perform a deblocking process on the current block or the neighboring block.

5. The method of claim 1, wherein the MCMV of the reference block is positioned at a center point of a sub-block of the reference block.

6. The method of claim 1, wherein the control point of the CPMV of the current block is positioned at a corner of the current block, and wherein a MCMV for a sub-block of the current block is positioned at a center point of the sub-block.

7. A method comprising:
   receiving input data associated with a current block to be coded;
   deriving a control point motion vector (CPMV) of the current block for a control point according to an affine model;
   deriving a set of motion compensation motion vectors (MCMVs) for a set of sub-blocks of the current block based on the derived CPMV of the current block according to the affine model; and
   performing motion compensation for the current block based on the set of MCMVs,
   wherein the CPMV of the current block is derived based on a CPMV stored in a first storage or a MCMV stored in a second, different storage,
   wherein motion information stored in the second storage is associated with the set of sub-blocks of the current block, blocks immediately above the current block, or blocks immediately left of the current block, and wherein deriving the CPMV of the current block comprises:
identifying a reference block of the current block;
retrieving a CPMV of the reference block when the reference block and the current block are located in a same region; and
retrieving a MCMV of the reference block when the reference block and the current block are not located in the same region.

8. An electronic apparatus comprising:
a video coder circuit configured to perform decoding by:
receiving input data associated with a current block to be coded;
deriving a control point motion vector (CPMV) of the current block for a control point according to an affine model;
deriving a set of motion compensation motion vectors (MCMVs) for a set of sub-blocks of the current block based on the derived CPMV of the current block according to the affine model;
performing motion compensation for the current block based on the derived set of MCMVs; and
storing the derived CPMV of the current block in a first storage and the derived MCMVs for the set of sub-blocks in a second, different storage,
wherein motion information stored in the second storage is associated with the set of sub-blocks of the current block, blocks immediately above the current block, or blocks immediately left of the current block, and wherein deriving the CPMV of the current block comprises:
identifying a reference block of the current block;
retrieving a CPMV of the reference block when the reference block and the current block are located in a same region; and
retrieving a MCMV of the reference block when the reference block and the current block are not located in the same region.

9. A method comprising:
receiving input data associated with a current block of pixels to be coded;
deriving a control point motion vector (CPMV) of the current block for a control point according to an affine model;
deriving a set of motion compensation motion vectors (MCMVs) for a set of sub-blocks of the current block based on the derived CPMV of the current block according to the affine model;
performing motion compensation for the current block based on the derived set of MCMVs;
wherein deriving the CPMV of the current block comprises:
identifying a reference block of the current block;
retrieving a CPMV of the reference block when the reference block and the current block are located in a same region; and
retrieving a MCMV of the reference block when the reference block and the current block are not located in the same region.

10. The method of claim 9, wherein, when the reference block and the current block are located in the same region, the reference block and the current block are in a same row of coding tree units (CTUs).

* * * * *